United States Patent
Clark

(10) Patent No.: US 6,978,093 B2
(45) Date of Patent: Dec. 20, 2005

(54) FREE SPACE OPTICAL COMMUNICATION NETWORK

(75) Inventor: Gerald R. Clark, San Diego, CA (US)

(73) Assignee: LightPointe Communications, Inc., San Diego, CA (US)

( * ) Notice: Subject to any disclaimer, the term of this patent is extended or adjusted under 35 U.S.C. 154(b) by 625 days.

(21) Appl. No.: 10/094,554

(22) Filed: Mar. 7, 2002

(65) Prior Publication Data

US 2002/0131123 A1    Sep. 19, 2002

Related U.S. Application Data

(60) Provisional application No. 60/274,888, filed on Mar. 9, 2001, provisional application No. 60/332,358, filed on Nov. 16, 2001.

(51) Int. Cl.[7] ............................................. H04B 10/00
(52) U.S. Cl. ...................... 398/124; 398/118; 398/168; 398/169
(58) Field of Search ........................ 398/118, 122–127, 398/168, 169, 170; 342/53, 54; 370/277, 370/913

(56) References Cited

U.S. PATENT DOCUMENTS

| | | | |
|---|---|---|---|
| 4,717,913 A | 1/1988 | Elger | 340/825.54 |
| 4,959,874 A | 9/1990 | Saruta et al. | 455/601 |
| 4,975,926 A | 12/1990 | Knapp | 375/1 |
| 5,068,916 A | 11/1991 | Harrison et al. | 455/39 |
| 5,099,346 A | 3/1992 | Lee et al. | 359/118 |
| 5,218,356 A | 6/1993 | Knapp | 342/350 |
| 5,221,983 A | 6/1993 | Wagner | 359/125 |
| 5,247,381 A | 9/1993 | Olmstead et al. | 359/118 |
| 5,321,542 A | 6/1994 | Freitas et al. | 359/172 |
| 5,321,718 A | 6/1994 | Waarts et al. | 372/108 |
| 5,371,734 A | 12/1994 | Fischer | 370/18 |
| 5,384,652 A | 1/1995 | Allen et al. | 359/174 |
| 5,585,953 A | 12/1996 | Zavrel | 359/152 |
| 5,600,471 A | 2/1997 | Hirohashi et al. | 359/152 |
| 5,726,786 A | 3/1998 | Heflinger | 359/152 |
| 5,748,813 A | 5/1998 | Cassidy et al. | 385/24 |
| 5,786,923 A | 7/1998 | Doucet et al. | 359/172 |
| 5,790,286 A | 8/1998 | Bae | 359/110 |

(Continued)

FOREIGN PATENT DOCUMENTS

| WO | WO 00/16489 A2 | 3/2000 |
|---|---|---|
| WO | WO 00/54413 | 9/2000 |

OTHER PUBLICATIONS

U.S. Appl. No. 10/096,121, filed Mar. 7, 2002, Clark.

(Continued)

*Primary Examiner*—Kenneth Vanderpuye
*Assistant Examiner*—Dzung Tran
(74) *Attorney, Agent, or Firm*—Fitch, Even, Tabin & Flannery

(57) ABSTRACT

The present invention provides a method and network for communicating over free space links. The network includes a plurality of buildings, each housing at least one of a residence and a business. Pluralities of free-space optical links are established, where each optical link is defined between two of the buildings, and data is communicated across the plurality of links. Each of the buildings includes a distribution system configured to receive the data communicated across at least one of the links and to distribute the data to an intended recipient. The plurality of optical links are configured to form a network topology providing alternate communication paths for at least two of the plurality of buildings and an external network is coupled with the optical communication network, wherein at least some of the data is communicated between the external network and the optical communication network.

12 Claims, 11 Drawing Sheets

U.S. PATENT DOCUMENTS

| | | | | |
|---|---|---|---|---|
| 5,837,996 | A | * | 11/1998 | Keydar .................... 250/221 |
| 5,844,705 | A | | 12/1998 | Rutledge .................. 359/167 |
| 5,883,730 | A | | 3/1999 | Coult et al. ............... 359/152 |
| 5,936,578 | A | | 8/1999 | Driessen et al. ........... 342/374 |
| 5,983,068 | A | * | 11/1999 | Tomich et al. ............... 725/32 |
| 5,999,295 | A | | 12/1999 | Vowell et al. ............. 359/152 |
| 6,034,966 | A | | 3/2000 | Ota ......................... 370/443 |
| 6,049,593 | A | * | 4/2000 | Acampora ............... 379/56.2 |
| 6,055,490 | A | * | 4/2000 | Dunne ..................... 702/159 |
| 6,104,513 | A | * | 8/2000 | Bloom ..................... 398/117 |
| 6,141,128 | A | | 10/2000 | Korevaar et al. .......... 359/152 |
| 6,239,888 | B1 | | 5/2001 | Willebrand ............... 359/118 |
| 6,288,813 | B1 | | 9/2001 | Kirkpatrick et al. ....... 359/152 |
| 6,323,980 | B1 | | 11/2001 | Bloom |
| 6,366,723 | B1 | | 4/2002 | Medved et al. ............ 359/125 |
| 6,381,055 | B1 | | 4/2002 | Javitt et al. ............... 359/159 |
| 6,404,941 | B1 | | 6/2002 | Picard et al. |
| 2002/0005972 | A1 | | 1/2002 | Bloom et al. .............. 359/172 |
| 2002/0027691 | A1 | | 3/2002 | Medved et al. .............. 398/40 |
| 2002/0028043 | A1 | | 3/2002 | Medved et al. .............. 385/30 |
| 2002/0048066 | A1 | | 4/2002 | Antoniades et al. ....... 359/128 |
| 2002/0051269 | A1 | | 5/2002 | Margalit et al. ........... 359/172 |
| 2002/0054411 | A1 | | 5/2002 | Heminger et al. ......... 359/159 |
| 2002/0054413 | A1 | | 5/2002 | Shivnan .................... 359/172 |
| 2002/0089727 | A1 | * | 7/2002 | Alwan et al. .............. 359/187 |
| 2002/0122230 | A1 | | 9/2002 | Izadpanah et al. ......... 359/145 |
| 2002/0131130 | A1 | | 9/2002 | Clark |

OTHER PUBLICATIONS

Louri, A., et al.; *Feasibility Study of a Scalable Optical Interconnection Network for Massively Parallel Processing Systems*; Applied Optics; Mar. 10, 1996; pp. 1296-1308; vol. 35, No. 8; Optical Society of America.

Acampora, A. S.; *The Scalable Lightwave Network*, IEEE Communications Magazine; Dec. 1994; pp. 36-42.

Brackett, et al.; *A Scalable Multiwavelength Multihop Optical Network: A Proposal for Research on All-Optical Networks*; Journal of Lightwave Technology; May/Jun. 1993; pp. 736-753; vol. 11, No. 5/6; IEEE.

Acampora, A. S.; *A Multichannel Multihop Local Lightwave Network*; GlobeCom; 1987; pp. 1459-1467; IEEE.

Patent Cooperation Treaty; "International Search Report", dated Jun. 12, 2002, for corresponding PCT Application No. PCT/US02/07223, 6 pages.

Patent Cooperation Treaty; "Written Opinion", dated Nov. 6, 2002, for corresponding PCT Application No. PCT/US02/07223, 6 pages.

Patent Cooperation Treaty; "International Preliminary Examination Report", dated Mar. 21, 2003, for corresponding PCT Application No. PCT/US02/07223, 6 pages.

Patent Cooperation Treaty; "International Search Report", dated Jun. 24, 2002, for the corresponding PCT Application No. PCT/US02/06984 for related U.S. Appl. No. 10/096,121, 6 pages.

Patent Cooperation Treaty; "Written Opinion", dated Nov. 27, 2002, for the corresponding PCT Application No. PCT/US02/06984 for related U.S. Appl. No. 10/096,121, 5 pages.

Patent Cooperation Treaty; "International Preliminary Examination Report", dated Mar. 18, 2003, for the corresponding PCT Application No. PCT/US02/06984 for related U.S. Appl. No. 10/096,121, 6 pages.

* cited by examiner

Active Mode

Loop Through Mode

FREE SPACE OPTICAL COMMUNICATION NETWORK

CROSS-REFERENCE TO RELATED APPLICATION

This application claims priority under 35 U.S.C. 119(e) to U.S. Provisional Patent Application No.: 60/274,888, filed Mar. 9, 2001, of Gerald Clark, for MULTI-TENANT UNIT OPTICAL NETWORK, and to U.S. Provisional Patent Application No. 60/332,358, filed Nov. 16, 2001, of Gerald Clark, for FREE SPACE OPTICAL COMMUNICATION NETORK, which U.S. Provisional Patent Applications are hereby fully incorporated herein by reference.

BACKGROUND

1. Field of the Invention

The present invention relates generally to a communication network, and more specifically to a free space optical communication network.

2. Discussion of the Related Art

Due to the absence of fiber in many areas of the world, broadband media is being delivered via satellite, coaxial cable, and over copper phone lines using various forms of digital subscriber line. These systems provide limited and restricted services. Additionally, these are costly systems and require large amounts of time and resources to implement. The use of coaxial cable and phone lines require gaining access to property (both public and private) to lay the cable and lines. This in itself can be cost prohibitive. Often, laying these cables requires the cables to be installed under ground requiring roads to be dug up and heavy equipment to be utilized. In rural areas the equipment often is unavailable. Thus, establishing these previous networks is extremely time consuming, disruptive to the community and extremely costly.

These previous systems also introduce a large amount of latency in the signal transmission. Using a satellite-based asynchronous system involves having the phone line as a back channel through the public switched telephone network to switch between different media, data or information, if these options are available. This creates a very long loop delay. Similar latency problems exist for digital cable systems that attempt to provide each user with a restricted bandwidth with a switched head end.

SUMMARY OF THE INVENTION

The present invention advantageously addresses the needs above as well as other needs through a method and apparatus for communicating over free-space fiber links. The optical communication network includes a plurality of buildings, wherein each building houses at least one of a residence and a business; a plurality of free-space optical links, where each of the plurality of optical links is defined between two of the plurality of buildings and data is communicated across the plurality of optical links; each of the plurality of buildings includes a distribution system configured to receive the data communicated across at least one of the plurality of optical links and to distribute the data to an intended recipient within the building; the plurality of optical links are configured to form a network topology providing alternate communication paths for at least two of the plurality of buildings; and an external network is coupled with the optical communication network, wherein at least some of the data is communicated between the external network and the optical communication network.

Additionally, the present invention provides a method of communicating optical signals. The method includes the steps of: establishing a plurality free-space optical communication links between a plurality of buildings, wherein each of the plurality of buildings houses at least one of a business and a residence; providing at least one alternate communication path within the network through at least one of the plurality of free-space links; optically communicating data over the plurality of free-space links; receiving the data at a first building; and distributing at least a first portion of the data throughout the first building to at least one recipient, where the recipient is one of the business and the residence.

In another embodiment, the invention can be characterized as a communication network including building distribution systems. The building distribution system includes a first rooftop transceiver mounted on a building and configured to transmit and receive optical signals over free space; and a first passive optical deflector (POD) mounted on the building and optically aligned with both the first rooftop transceiver and a first customer premise equipment (CPE), wherein the first POD is configured to receive a first optical signal from the first rooftop transceiver and redirect substantially all of the first optical signal to the first CPE providing a first optical communication path between the first rooftop transceiver and the first CPE, and wherein the first POD is configured to receive a second optical signal from the first CPE and redirect substantially all of the second optical signal to additional equipment extending the first communication path between the first CPE and the additional equipment.

In another embodiment, the invention can be characterized as a method for communicating over free space links. The method includes the steps of generating a first optical communication signal and transmitting the first optical signal at least in part over free space along an exterior of a building; redirecting the first optical signal to be received by a first customer premise equipment (CPE); the first CPE receiving the first optical signal; the first CPE re-transmitting at least a portion of the first optical signal; redirecting for a first instance the first optical signal re-transmitted by the first CPE over free space along the exterior of the building; redirecting for a second instance the first optical signal re-transmitted by the first CPE to be received by a second CPE; and the second CPE receiving the first optical signal.

In another embodiment, the invention can be characterized as a system for optical communications. The system includes a distribution system including: a first premise equipment means for receiving and transmitting optical signals; a second premise equipment means for receiving and transmitting optical signals; an optical signal initiation means for transmitting a first optical signal across free space; a first redirecting means for receiving the first optical signal from the optical signal initiation means and for redirecting substantially all of the first optical signal to the first premise equipment means; a second redirecting means for receiving a second optical signal from the first premise equipment means and for redirecting substantially all of the second optical signal; and a third redirecting means for receiving the second optical signal from the second redirecting means and for redirecting substantially all of the second optical signal to the second premise equipment means.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

The present invention provides a method and apparatus for establishing free space optical communication. Due to the absence of fiber in many areas of the world, broadband media is being delivered via satellite, coaxial cable, and over copper phone lines using various forms of digital subscriber lines. The present free-space optics network solves many of the restrictions of previous networks. The present invention provides a digital network that is based on communicating over one or more free space channels or free space fibers. The inventive network offers communication of a broad range of digital media beginning with a single connection to an existing network, such as an optical fiber network and extending the reach of the fiber to both businesses and residents. The reach is extended by utilizing free space links, thus avoiding the need to install costly fiber optic lines, coaxial cables and phone lines. In one embodiment, the invention utilizes a multi-cast Internet Protocol based system that allows several types of media to be delivered to recipients (for example, to both homes and businesses) with various bandwidths and qualities of service customized to each recipient.

Figure 1:
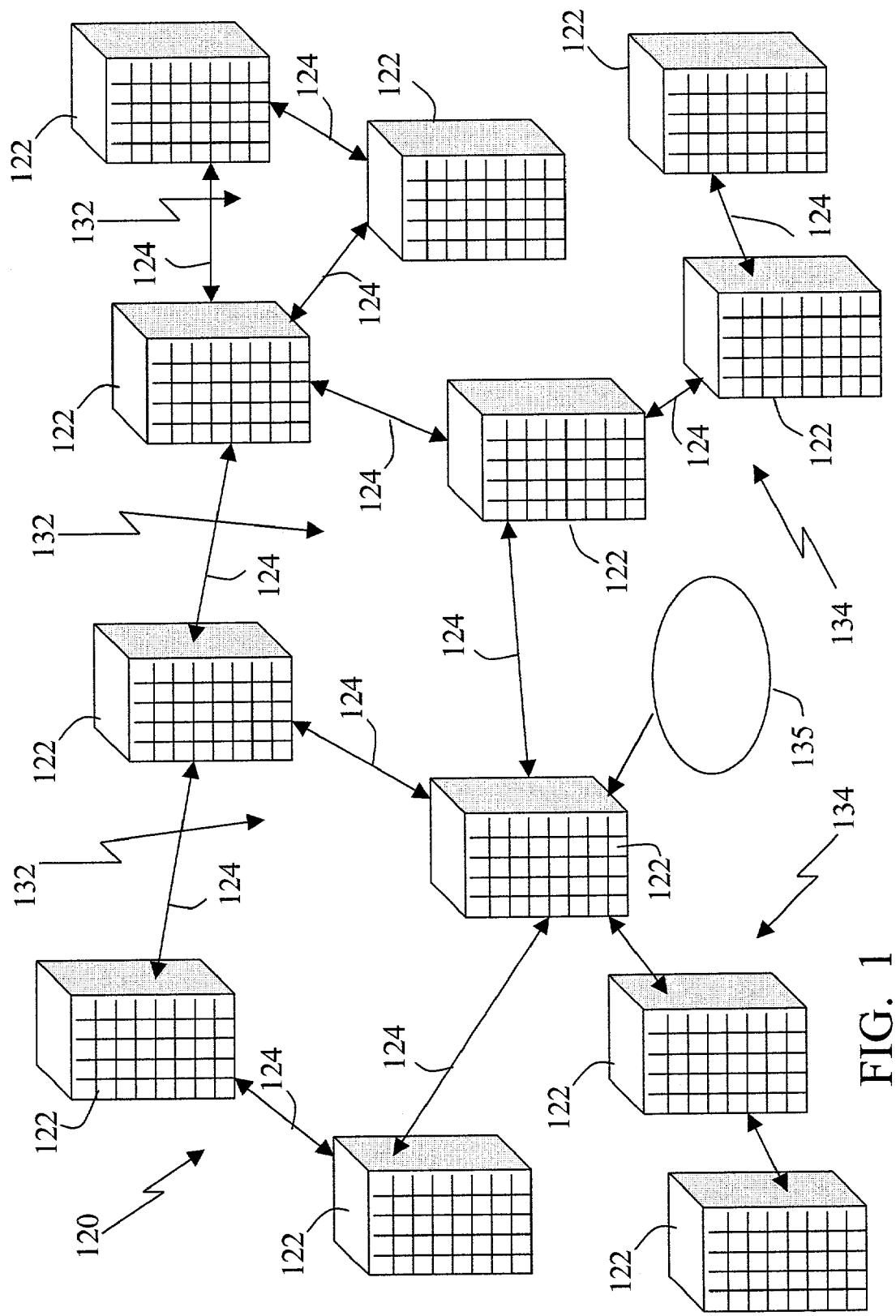
FIG. 1 depicts a simplified block diagram of one implementation of one embodiment of a free space network of the present invention providing communication for both business and residential multi-tenant buildings.

The free-space fiber network can be established using both residential and business buildings, for example in a metropolitan area. FIG. 1 depicts a simplified block diagram of one implementation of one embodiment of a free space network 120 of the present invention providing communication for both business and residential multi-tenant buildings 122 over free space fibers or links 124. As one example, the buildings are connected using ring 132 and spur 134 topologies of the free-space fiber network 120. A ring and spur network topology in which both residences and businesses share the free-space network 120 is one example of several optimal configurations. A ring network 132 having one or more rings connecting high speed business customers with one or more spurs 134 off the one or more ring networks connecting residential customers is one example of an efficient and economic network configuration. The ring and spur configuration provides redundancy to protect against link failure. In one embodiment, the network is configured as a mesh network providing link failure protection and alternate routing. The network 120 can couple with an external network 135 allowing communication of data into and out of the network 120.

In one embodiment, the network 120 operates all optically. Once data, information and/or signals are received into the network, the data, information and/or signals are converted to an optical signal, if they are not received as an optical signal. The optical signal is then communicated across the free-space fibers as optical beams directed from optical transmitters to optical receivers. Once at the residence or business, the optical signal is then converted to an electronic signal for use by the customer's equipment, such as a computer, a set top box (STB) or other devices.

In one embodiment, the media communicated over the network 120 includes both broadcast and on-demand data, including video, voice, data, audio, and substantially any other media that can be communicated, including media transmitted over an IP-based multi-cast network. The bandwidth savings achieved using a multi-cast network occurs, in part, when each user selects a different digital media source through a computer, (STB) or other network access device that directs or couples the media from a multi-cast controller or digital head end controller to the correct multi-cast address for one or more subscribers. The system can support both broadcast type media and on-demand material, such as stored digital movies on a server.

In one embodiment, each subscriber, whether business or residential, can be allocated a fixed amount of bandwidth independently and allowing each subscriber to use the shared backbone network aggregate available. For instance, using a free-space fiber optical link 124 in a backbone ring 132 that supports gigabit rates, the present network is capable of providing 100 or more channels of MPEG-2 video at 3 Mbps each stream and video on demand to another 100 or more users simultaneously. Additionally, a connection or point of presence (POP) to an external network 135, such as the Internet, can also be switched into the network and bundled with other services like voice over IP (VOIP) and other services and information available over the Internet. Another advantage of the present system is the low inherent latency through the free-space fiber optical links 124. For example, the present invention can provide a latency of less than 1 microsecond through each link allowing the subscriber to select different media from the head end control equipment at a very rapid switching rate. This low-latency feature makes switching channels happen at an acceptable delay to the end user. Previous satellite-based asynchronous systems involve having the phone line as a back channel through the public switched telephone network to accomplish a similar task. This creates a very long loop delay compared to what is possible with the present free-space fiber network. Similar latency problems exist for digital cable systems that attempt to provide each user with a restricted bandwidth with a switched head end.

Another advantage of the free-space fiber network 120 is that a new link can be established in hours versus months and potentially years with previous systems waiting for copper or optical fiber cable to be installed.

The present terrestrial-based free-space fiber network and method provide interactivity. For example, a user receiving a video on demand service can choose to rewind or fast forward the video as if it were running from a VCR over a truly interactive digital network. The free-space fiber network provides this interactive capability with only very minimal latency. Satellites are good for broadcast media but fail to deliver user interactivity.

Figure 2:
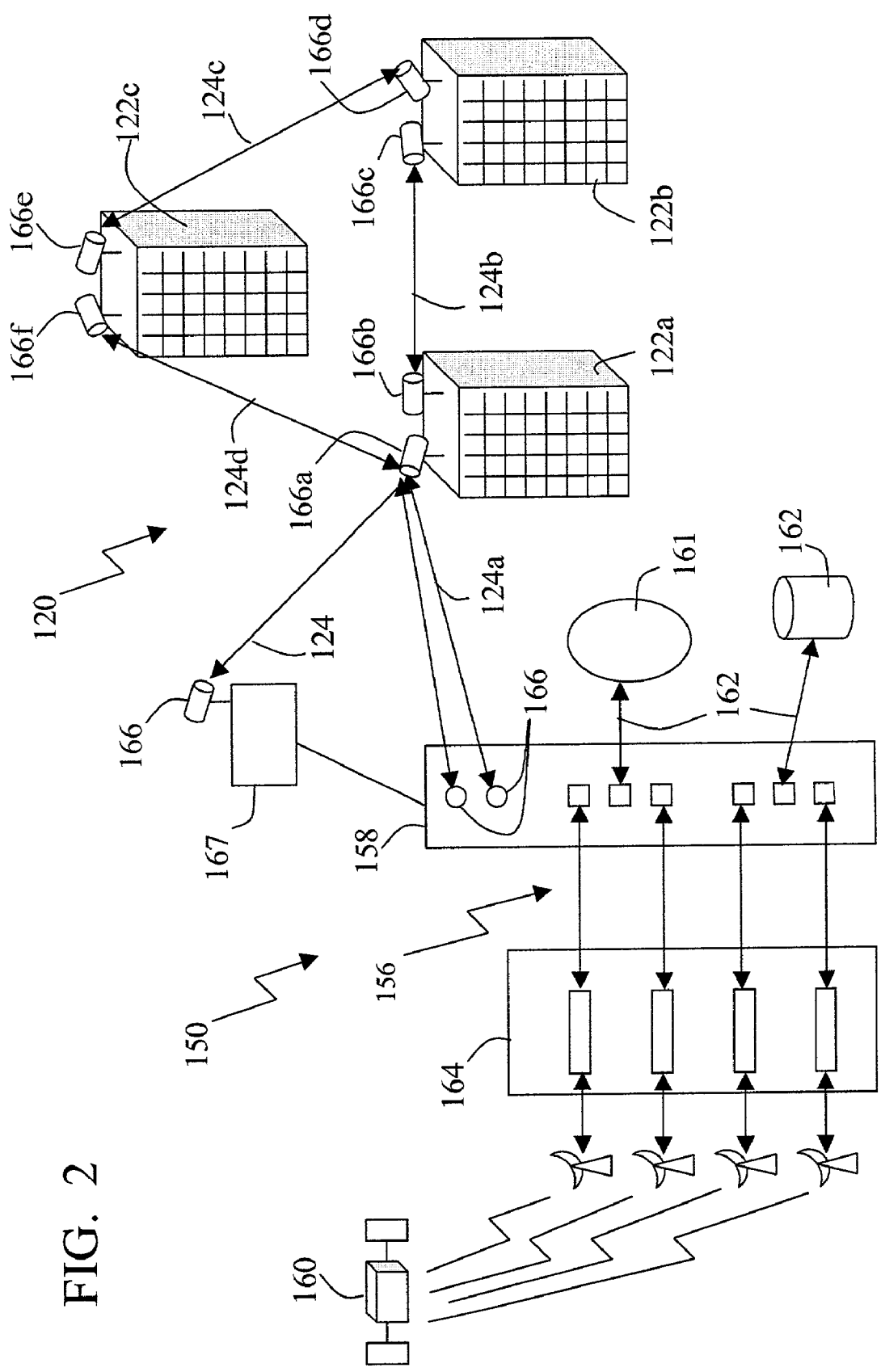
FIG. 2 depicts a block diagram of one implementation of one embodiment of a multicast IP-based network.

FIG. 2 depicts a block diagram of one implementation of an optical free network 120 according to one embodiment of the present invention providing multicast communication, such as multicast IP-based communication. The network configuration 150 depicts how various media are supplied from and to a variety of external sources or networks, including satellite 160, Internet 161, video on demand (VOD) 162 and other external networks. Data supplied by the external networks are routed and/or switched over the free-space fiber network 120. For example, data 156 received from a satellite 160, the Internet 161 and/or a VOD server 162 are forwarded to a router or switch 158. The switch 158 couples with one or more optical transceivers 166.

The optical transceiver can be mounted on a building, antenna or other structure. The transceiver 166 receives the data and generates an optical beam that is directed across one or more free space links 124, such that the data is communicated through the beam over the free space link to be received by one or more optical transceivers 166. Typically, the transceivers are mounted on a building 122. The mounting can be on the roof, a balcony, on an exterior wall or other position on the building to provide a line of sight free-space optical link 124 between two transceivers on different buildings. Once the data is received by a receiving transceivers 166, all, a subset or none of the data can be distributed throughout the building 122 to the appropriate customers in the building 122, or forwarded over additional free-space fiber links 124 to other transceivers on other buildings throughout the free-space network 120.

In one embodiment, a transceiver 166 on a building 122 couples with a router or other device (not shown) capable of determining if a portion of the data received by the transceiver is to be delivered to a customer housed within the building. If data is intended for a customer, the routing device forwards the portion of data to the customer. Typically the free-space network 120 is configured such that each building 122 includes a distribution system (described more fully below) to distribute data received by transceivers and to forward data from customers to the transceivers to be communicated across the network 120 to other buildings and/or to external network(s) 160–162.

The network 120 is further configured to allow transceivers to receive data from the external networks 160–162 or other optical transceivers 166 on other buildings and can re-transmit the data across the free-space network 120 to other buildings or external networks. For example, still referring to FIG. 2, a first transceiver 166a on a first building 122a can receive a first set of data from an external network (e.g., the satellite network 160). The transceiver 166a can receive the data over a first free space link 124a or through direct coupling to the switch 158. A second transceiver 166b can generate an optical signal to communicate a second set of data over a second free space link 124b to a third transceiver 166c on a second building 122b. The second set of data communicated to the third transceiver 122c can include data received by the first transceiver and/or data generated by one or more customers within the first building 122a.

Some, none or all of the data received by the third transceiver 166c can be distributed throughout the second building 122b. A fourth transceiver 166d on the second building 122b can generate an optical signal to transmit a third set of data over a third free space link 124c to a fifth transceiver 166e on a third building 122c. Again, the data transmitted by the fourth transceiver 166b can include data received by the third transceiver 166c and/or new data generated by one or more customers within the second building 122b. The data received by the fifth transceiver 166e can be distributed throughout the third building 122c. A sixth transceiver 166f can communicate a fourth set of data to the first transceiver 122a over a fourth free space link 124d establishing a ring topology 132, where the data can include data received by the fifth transceiver or new data from one or more customers in the third building 122c.

Additionally, the first transceiver 166a can communicate data from the free space network 120 to the switch 158 over the first free space link 124a or direct coupling to be distributed to one or more external networks 160–162.

In one embodiment, the switch 158 includes one or more free space optical transceiver for communicating with one or more transceivers 166 of the network 120. The router or switch 158 can be substantially any router or switch capable of routing data to and from the free space optical network 120, for example the switch can be implemented through a GbE switch, a Cisco 2900MXL switch, a Cisco Catalyst 2948G (from Cisco Systems, U.S., California), or substantially any other device capable of providing switching or routing of data. The switch 158 can further be configured to provide communication to and from the free-space network 120 and the external networks 160–162 in substantially any protocol.

In one embodiment, the network 120 includes a network controller or control center 167 located anywhere in the network. The control center provides any number of control functions. The control center can be configured to monitor and control some or all of the activation and deactivation of the distribution of data and/or information to recipients. The control center 167 can couple with the network through direct coupling or through wireless links 124. In one embodiment, the control center is distributed through the network 120 to collect network data. The control center can monitor the free-space network 120 to determine if faults occur and issue alternate routing or actions to compensate for the fault. The control center 167 can further optimizes bandwidths by providing communication instructions for some signals. As an example, the control center may issue priorities for different media such that media with higher priories are given bandwidth over those of lower priority.

In one embodiment, the control center 167 monitors the network traffic and determines billing for network use and access. The control center can be utilized to manage customers, support services and aid in collecting money. A billing system within the control center can provide billing based on usage. The control center allows Internet and broadband content, service and application providers to sell, deploy and/or distribute content, services or applications, track the content, services or applications deployed or used, and bill for the content, services and/or applications based on actual or potential use, or other criteria. As such, the free-space network 120 allows content, service and application providers to profit on products and/or information provided by the business infrastructure solutions of the network 120. The control center 167 can track and supplement interactions and transactions between content, service, application and network providers, as well as between providers and users.

Figure 3:
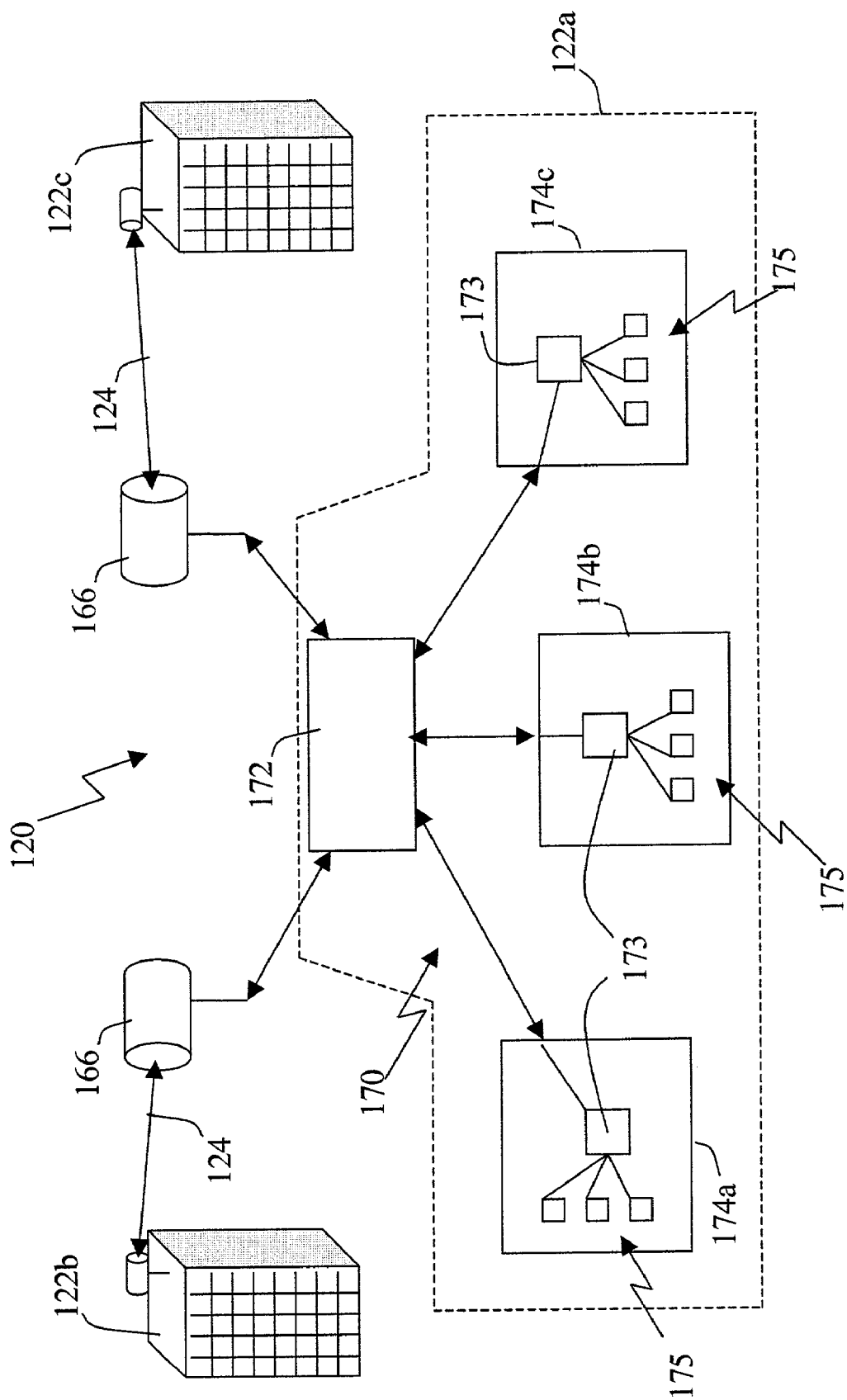
FIG. 3 depicts a simplified block diagram illustrating distribution methods from the free-space fiber links to recipients, such as business' or residential customer's premises.

FIG. 3 depicts a simplified block diagram of a free space optical communication network 120 according to one embodiment of the present invention. Each building 122 within the network 120 can include one or more building distribution systems 170 for distributing data received over the free-space fiber links 124 to a customer's premises, computer(s), server(s) and/or internal network(s) 175. For example, once data is received over a free space link 124 at a first building 122a by optical transceivers 166, the data is forwarded to a building router or switch 172. The building switch 172 couples with and is configured to direct the data to one or more of the buildings one or more existing internal wiring and/or fiber systems 174a–c. In one embodiment, the building switch 172 performs routing to deliver the data over one or more of the existing wiring systems 174 to the intended customers 175. If the building 122 includes a plurality of exiting internal distribution systems 174, the switch is configured to determine which of the internal distribution systems 174 is to receive the data, and formats the data for the intended distribution system.

In one embodiment, the internal wiring systems 174a–c receive the data and routes the data through internal system hubs, switches or routers 173 to an intended customer 175. The building switch 172 is capable of communicating the data through substantially any type of internal system 174 including, Ethernet cable, coaxial cable, twisted wire pair, RC networks, fiber optics and substantially any other system. The building switch 172 includes network interfaces to couple with the one or more distribution systems 174, such as RJ45 interfaces, fiber optic transceivers, and substantially any other interface.

The customers 175 can additionally forward data over one or more internal systems 172 to be received by the building switch 172. The building switch forwards the data from the customer to one or more optical transceivers 166 to be transmitted over one or more of the free space links 124 distributing the data over the free space network 120 to other buildings 122b–c and/or to external networks.

Figure 4:
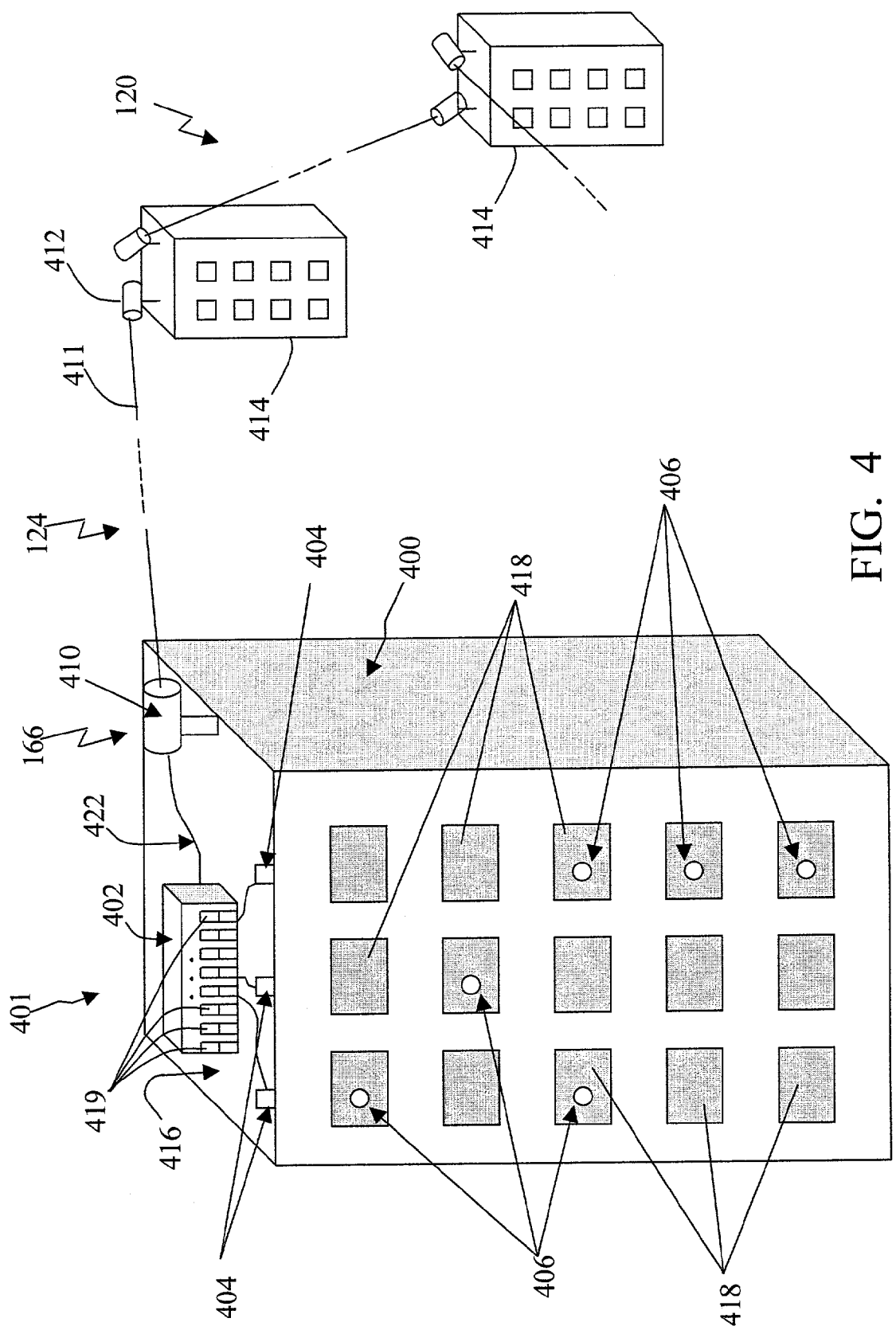
FIG. 4 is a pictorial diagram illustrating a multi-tenant unit (MTU) optical network made in accordance with an embodiment of the present invention.
Figure 5:
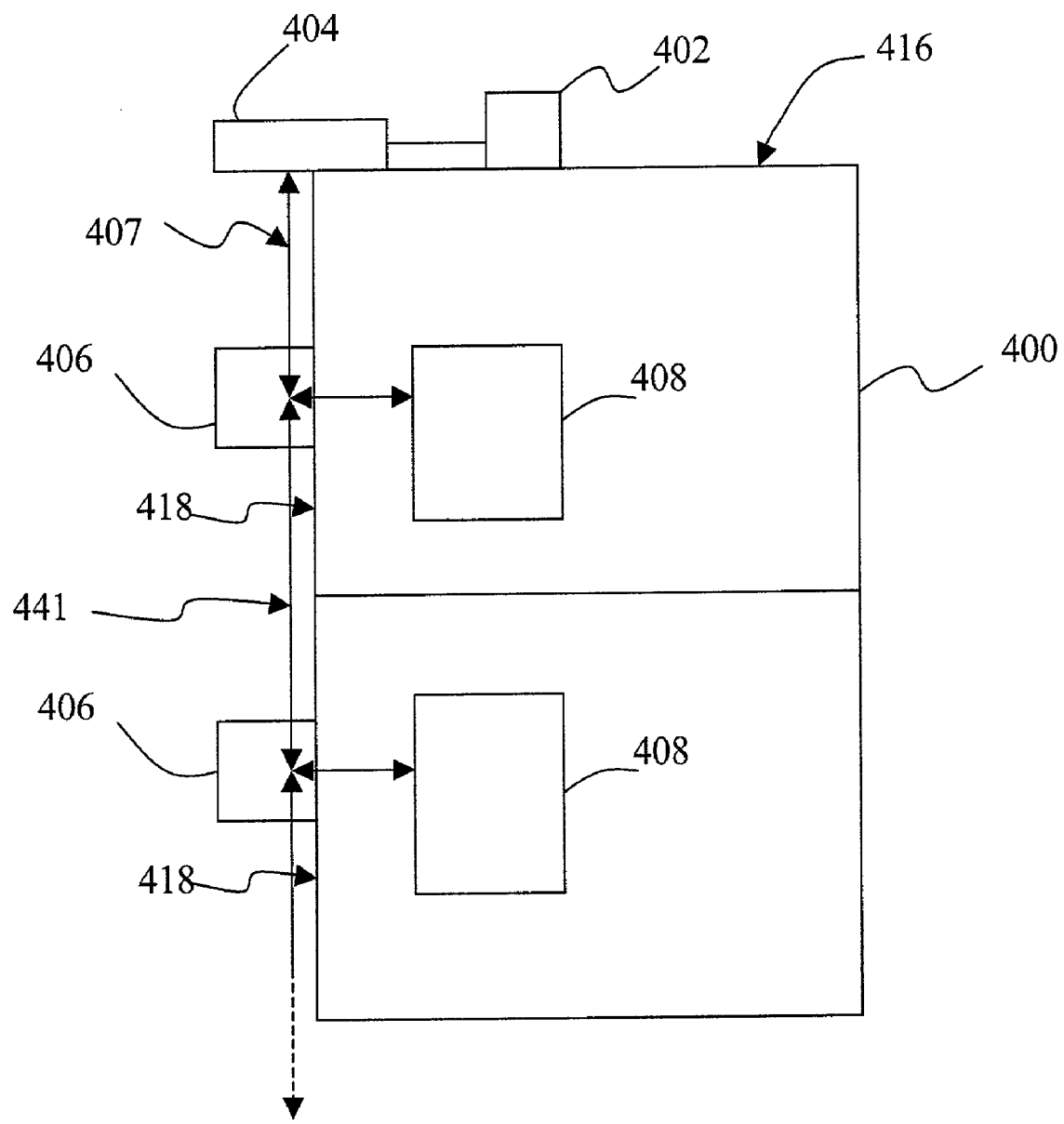
FIG. 5 is a simplified block diagram of one embodiment of the MTU network.

Referring to FIGS. 4 and 5, there is a simplified block diagram illustrating a building 400 that includes a multi-tenant unit (MTU) optical data distribution network 401 made in accordance with an embodiment of the present invention. The MTU optical network 401 may also be referred to as a multi-dwelling unit (MDU) optical network. The MTU network 401 couples with the free-space network 120 to receive data from the network 120 and distribute the data to customers within the building, and to communicate data from the customers to the free-space network 120. In the embodiment shown, the MTU optical network 401 includes a customer distribution unit (CDU) 402 (alternatively referred to as a subscriber distribution unit (SDU) 402), one or more rooftop transceivers 404, one or more passive optical deflectors (PODs) 406, and customer premise equipment (CPE) 408.

The rooftop transceivers 404 preferably comprise optical transceivers mounted to the edge of the building rooftop 416, and couple with the CDU 402. The PODs 406 optically align with one or more rooftop transceivers 404 such that the rooftop transceivers 404 transmit and receive optical signals 407 to and from the PODs 406. The PODs further optically align with one or more CPEs 408. Typically, each POD aligns with one CPE 408. The PODs 406 receive the optical signals and direct or steer the optical signals to be received by the CPE 408, and receives optical signals from the CPEs and directs the optical signals to be received by the rooftop transceiver 404. The PODs 406 preferably direct substantially all of the optical signals to the CPE 408 or to the rooftop transceivers 404. By directing the optical signal, a POD 406 allows a building tenant to receive a high bandwidth optical signal without the need for wiring the building 400. In one embodiment, the PODs are mounted to the building windows 418, and redirect the optical signals through the building window 418 to be received by the CPE 408 and redirect the optical signals from the CPE to the rooftop transceiver.

In one embodiment, the MTU network 401 does not include rooftop transceivers, but includes alternate optical signal initiation means or sources. For example, the CDU 402 can couple directly to a CPE transceiver 408 that is the highest on the building 400. The CPE transceiver then initiates the optical communication signal to a POD 406, which in turn redirects the optical signal to one or more PODs and thus one or more other CPEs.

In one embodiment, the CDU 402 couples with the free-space communication network 120 providing communication of data and information to and from the MTU network 401. The term data is used to describe any communication across the MTU network 401 and communication across the free-space network 120, including both digital and analog signals carrying information, audio, services, instructions, applications, processes and substantially any other data that can be communicated.

In one embodiment, the CDU 402 couples with a free-space optical transceiver 166, such as a laser link head 410. The laser link head 410 provides communication with the free-space optical network 120. The laser link head 410 may operate as an electro-optical device converting between optical and electrical, or operate all optically. For example, the laser link head 410 may provide strictly optical communication where the link head receives optical communication signals 411 over a free-space link 124 from a second link head 412 located at some distance, for example, located atop a second building 414. The link head 410 then forwards an optical signal across a communication cable 422 to be distributed through the MTU network 401. In this scenario the communication cable 422 would comprise a fiber optic cable or the like. Additionally, the link head receives optical signals through the communication cable 422 and transmits an optical signal 411 across the free-space link 124.

In one embodiment, the link head 410 receives optical signal and converts the signal to an electrical signal. The link head then converts the electrical signal to an optical signal and forwarded the optical signal across the fiber optic cable 422 to the CDU 402.

Alternatively, the link head 410 can provide electro-optical communication where the link head 410 receives an optical signal 411 from the second link head 412, converts the optical signal to an electric signal and forwards the signal over a communication cable 422 to be distributed through the MTU network 401. In this scenario the communication cable 422 would comprise an electric transmission line or the like. Additionally, the link head receives electrical signals through the communication cable 422, converts the electrical signal to an optical signal and transmits the optical signal 411 across one or more free-space links 124.

In one embodiment, the MTU network 401 couples with the free-space network 120 from the rooftop through the optical transceiver link head 410 to the CDU 402. As such, the customers are able to communication both within the MTU network 401 and with the free-space network 120 (e.g., phone lines coupled throughout the world). Communication received from the free-space network 120 is sent to the CDU 402 where the CDU directs the signal to an appropriate rooftop transceiver 404. In one embodiment, the CDU 402 includes routing capabilities to determine which of the plurality of rooftop transceiver 404a–c are to receive the signal. Alternatively, the CDU distributes or routes the signal to each rooftop transceiver and each rooftop transceiver forwards the signal to be received and processed by the appropriate destination CPE.

Once routing is determined, the CDU 402 sends the signal to one or more of the rooftop optical transceivers 404a–c. The rooftop optical transceiver 404 forwards the signal to one or more PODs 406. The signal can be sent from the CDU to the rooftop transceiver 404 as an optical signal over a fiber optic cable or as an electrical signal through a transmission line where the rooftop transceiver converts the electrical signal into an optical signal.

The rooftop transceiver 404 generates an optical signal and transmits the optical signal 407 over free space, typically along the exterior of the building 400. The rooftop transceiver 404 directs the optical signal 407 to impinge on one or more PODs 406. The POD 406 redirects the optical signal to a customer, for example, through the customer's (or tenant's) premise window 418. The transmitted signal 407 from the rooftop transceiver 404 typically spans a sufficient distance to reach the first POD 406. By way of example, this range can be as far as 300 meters or more, limited only by the height of the building and the precision of the transmission source (e.g., a laser) of the rooftop transceiver 404. Typically, the optical signal 407 is generated through a laser (not shown). The beam divergence, wavelength, and signal power are configurable parameters for the MTU system 401.

The POD 406 receives the optical signal 407 and redirects the signal through the customer premise window 418, to be received by the CPE 408. Advantageously, the optical delivery system provided by the MTU optical network 401 of the present invention does not require installing or stringing electrical wires, fiber optic cable or fiber risers throughout the building to deliver data to the end user, e.g., the customer.

In one embodiment, the CDU 402 is positioned on the rooftop 416 of the building 400 and constructed to operate in all weather conditions. Alternatively, the CDU 402 may be co-located with other indoor network equipment. For example, the CDU 402 may be located within the building 400 near routing/switching equipment. In the illustrated embodiment, the CDU 402 includes eight optical transceiver interfaces 419, but it should be well understood that any number of interfaces may be included. The interfaces 419 couple with the rooftop transceiver 404, and transmit and receive signals to and from the rooftop transceivers 404.

The CDU 402 may include an electrical data transceiver source or a passive optical network (PON) data transceiver source. For the PON scenario the rooftop transceivers 404 may be optically coupled to the optical transceiver interfaces 419 of the CDU 402. For example, the rooftop transceivers 404 may be fed by single or multi-mode fiber 420 from the CDU 402, which may operate at substantially any bit rate appropriate for the application. Similarly, the CDU 402 may be fed by single or multi-mode fiber 422 from the laser link head 410, again operating at various bit rates. In a scenario where the CDU 402 comprises an electrical data transceiver source, electrical signals from the layer 2/3 device are converted to optical signals through the rooftop transceivers 404.

Figure 6:
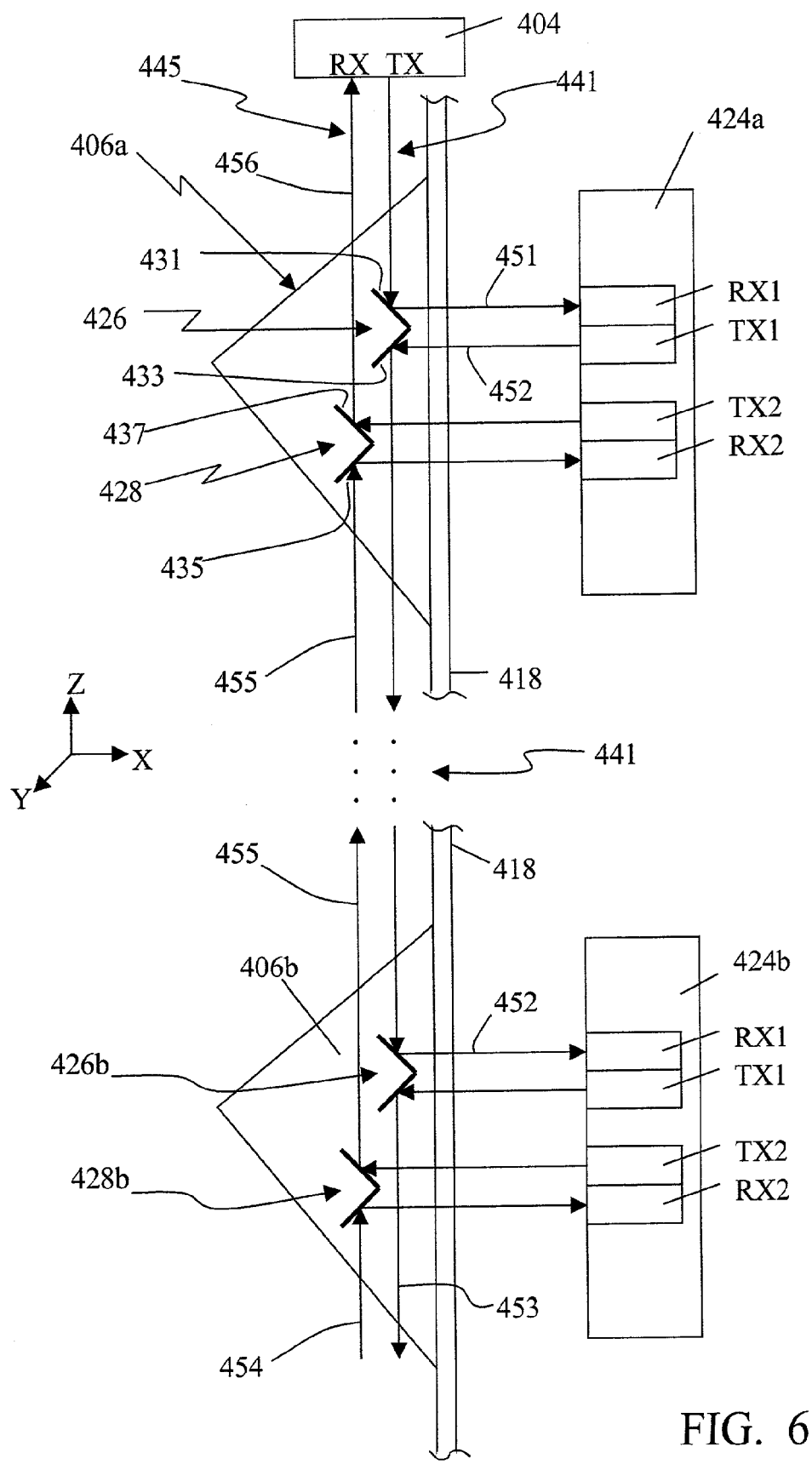
FIG. 6 is a simplified schematic diagram illustrating passive optical deflectors (PODs) and customer premise equipment (CPE) transceivers shown in FIGS. 1 and 2.

Referring to FIG. 6, there is illustrated a simplified block diagram of two PODs 406a–b, each optically coupled with a CPE transceiver 424a–b, respectively. Further, the first POD 406a is optically aligned and coupled with a rooftop transceiver 404, and the second POD 406b is optically aligned with the first POD 406a and thus coupled with the rooftop transceiver 404 through optical communication paths 441, 445. In the embodiment shown in FIG. 6, the transmit and receive paths are distinct, however, a single, collinear path can be utilized for both the transmit and receive paths. The optical transmit and receive signals may utilize substantially any wavelength. By way of example, a single wavelength signal at 850 nm may be used for a signal 451 transmitted by the rooftop transceiver 404, and a single wavelength signal at 850 nm may be used for the signal 456 received by the rooftop transceiver 404. By way of another example, wavelengths in the range of 1330 nm may be used for the transmit signal 451 and wavelengths in the range of 1500 nm may be used for the receive signal 456. The power level of the transmit and receive signals are of sufficient power to propagate to the POD 406 or to the rooftop transceiver 404 such that the signal is accurately received. By way of example, signal power for the transmitter in the rooftop transceivers 404 may be 3 mW IEC class IIIA. Further, the dynamic range for the receiver in the rooftop transceivers 404 is sufficient to accurately receive the optical signals. For example, the dynamic range for the receiver of the rooftop transceiver may be −45 to −12 dBm. It should be well understood, however, that various other specifications may be used in accordance with the present invention. The transmitter and receiver of the CPE transceiver 424 can be similarly configured; however, alternate configurations may be employed, as would be apparent to one skilled in the art.

The POD 406 is constructed to optically redirect optical signals to and from the CPE transceiver 424. Typically, the redirection of the optical signals is achieved through reflection or deflection of the signals. The PODs 406 are configured to minimize attenuation of the redirected signals. Further, the PODs 406 are constructed to minimize or prevent water beading to avoid signal distortion and minimize or prevent dust and dirt particles from settling on the surfaces of the POD 406, which can adversely affect the optical signals. The body of the PODs 406 can be made from substantially any material capable of passing optical signals including glass, plastic and other such material. In one embodiment, the body of the PODs are made of an optically transparent material that is transparent for a narrow wavelength band. Alternatively, the PODs are constructed from substantially any optically transparent material. In one embodiment, the PODs 406 are made strictly of glass. Such PODs 406 are passive components rather than active. Therefore, the MTU optical network 401 of the present invention may be referred to as an MTU "semi-PON".

The PODs 406 can have substantially any geometric shape allowing the optical signals to be redirected by the reflective elements 426, 428 within the POD. For example, the POD can have a triangular, pyramid, hyperbolic or other shape that allows the optical signal to pass into the POD and be redirected by one or more reflective elements to be received by a CPE. The POD can also be configured to redirect the optical signal to impinge upon another POD to allow the other POD to direct the signal a CPE or yet another POD. For example, a first POD can redirect an optical signal horizontally to a second POD. For example, the second POD can be positioned on a corner of the building allowing the redirection of the signal to another side of the building and thus to other customers within the building. This can be utilized to reduce the number of rooftop transceivers needed to establish a plurality of communication paths.

Still referring to FIG. 6, each POD 406 includes one or more reflective elements 426. The reflective element 426 can be formed through air pockets (or air cavities), reflective mirrors, materials within the POD body for redirecting the optical signals, and the like. In one embodiment, the POD 406 includes one or more air pockets 426, 428 that provide reflective surfaces 431, 433, 435, and 437 upon which optical signals reflect. In one embodiment the air pockets are generally "V" shaped. Typically, a first air pocket 426 is included for redirecting signals 451 transmitted from the rooftop transceiver 404 or other optical signal initiation source. The POD 406 can include a second air pocket 428 for redirecting a signal 456 from a CPE transceiver 424 to be received by the rooftop transceiver 404. Preferably, the divergence of the beam impinging on a reflective element 426, 428 is limited such that the beam width does not exceed the width of the reflective element 426, 428. By way of example, the reflective index for the air pockets 426, 428 within the POD glass may be one (1), and each of the air pockets 426, 428 may be 4 cm wide. With a 4 cm wide reflective element 426, 428, the transmit and receive beam divergence is preferably less than 1.5 mRad such that the beam width at a range of 300 meters does not exceed the width of the air pockets 426, 428 within the POD 406 (4 cm). In some embodiments, attenuation of beams passing through and being redirected by the POD 406 is approximately 3 dB. The width of the reflective elements 426, 428 can be substantially any size. However, the width is preferably limited to avoid an excessively large POD.

In one embodiment, the POD is configured such that the first reflective element 426 is offset from the second reflective element 428. Thus, two independent optical communication paths 441 and 445 are provided. Typically, these optical communication paths 441 and 445 are substantially parallel and non-collinear. However, these communication paths do not have to be parallel. In one embodiment, the POD can include only a single reflective element such that the first and second communication paths are collinear. The offset of the two reflective elements 426 and 428 can be along a Y-axis, along an X-axis or some combination, for example, along the X and Y, X and Z, or X, Y and Z-axes.

In operation a first optical signal 451 transmitted by the rooftop transceiver 404 impinges on the first reflective surface 431 of the first reflective element 426a. The first reflective element redirects the first optical signal 451 to be received by the first CPE transceiver 424a. The first CPE transceiver 424a transmits a second optical signal 452 to impinge on the second reflective surface 433 of the first reflective element 426, which in turn redirects the second optical signal 452 to impinge on the first reflective element 426b of the second POD 406b. In one embodiment, the first CPE transceiver 424a re-transmits or reflects the first optical signal to produce the second optical signal. The second optical signal can also include data from the first optical signal and data added by the first CPE transceiver 424a. Further, the second optical signal can include data from the first optical signal excluding data intended for the first CPE transceiver 424a.

The first reflective element 426b of the second POD 406b redirects the second optical signal 452 to be received by the second CPE transceiver 424b. The second CPE transceiver can transmit a third optical signal 453 to impinge on the first reflective element 426b, which redirects the third optical signal to additional equipment, such as other PODs and CPEs if other PODs and CPEs exist in the communication paths.

The second POD 406b is further configured to receive a fourth optical signal 454 from additional equipment (not shown) and to redirect the fourth optical signal to be received by the second CPE transceiver 424b. The second CPE transceiver can additionally transmit a fifth optical signal 455 to impinge on the second surface of the second reflective element 428b of the second POD 406b. The fifth optical signal 455 can include all or part of the fourth optical signal, and may also include additional information provided by the second CPE transceiver 424b. The second reflective element 428b redirects the fifth optical signal 455 to impinge on the first reflective surface 435 of the second reflective element 428a of the first POD 406a, which in turn redirects the fifth optical signal to the first CPE transceiver 424a. The first CPE transceiver can transmit a sixth optical signal 456 to impinge on the second reflective surface 437 of the second reflective element 428a of the first POD 406a, which in turn redirects the sixth optical signal 456 to be received by the rooftop transceiver 404.

The POD 406 is typically designed to deflect the signals 90 degrees from the angle of impact, but this is not required and can be substantially any angle for alignment with the CPE 408. The POD 406 is preferably designed to provide maximal water beading to prevent dirt particles from settling on the upper surface of the external body. The POD 406 is typically mounted to the surface area of the external building window 418. However, alternative mountings can be employed as would be apparent to one skilled in the art. As an optional feature, the POD 406 may be equipped with a safety mounting cable such that the POD 406 can be attached to a mounting point on or near the window.

Still referring to FIG. 6, the CPE transceivers 424a–b may be used to receive the optical signals deflected from the PODs 406. In one embodiment, signals transmit from and receive by the CPE transceiver 424 (e.g., first and sixth optical signals 451, 456, respectively) are separate and distinct; however, the transmit and receive paths can be a single path where the signals are separated by the CPE transceiver. Transmit signals 451 from the rooftop transceiver 404 (or another CPE and POD) are deflected from the first available POD 406a into the receive port RX1 of the CPE transceiver, for example, first CPE transceiver 424a. If data carried by the optical signal 451 is addressed to the first CPE transceiver 424a, then the first CPE transceiver 424a processes the signal 451, allowing the customer access to the data. If the signal includes data that is not intended for the first CPE transceiver 424a, then the first CPE transceiver 424, routes or re-transmits the optical signal, and thus the data, back to the first POD 406a using transmit port TX1 producing the second optical signal 452. Attenuation introduced by the POD 406 is preferably compensated for by the first CPE transceiver 424a at the transmit port TX1. By way of example, the signal power for the CPE transmitters may be 3 mW class IIIA, and the dynamic range for the CPE receivers may be −45 to −12 dBm. In one embodiment, the POD and CPE equipment are co-located allowing the reduction of the size of the PODs and the transmit and receive apertures of the CPE equipment.

The CPE transceivers 424 may be either active or passive in accordance with the present invention. Active CPE transceivers 424 perform routing, while passive CPE transceivers 424 simply pass the traffic along to customer equipment. The following discussion focuses on a comparison of an active versus passive CPE transceiver 424.

Figure 7:
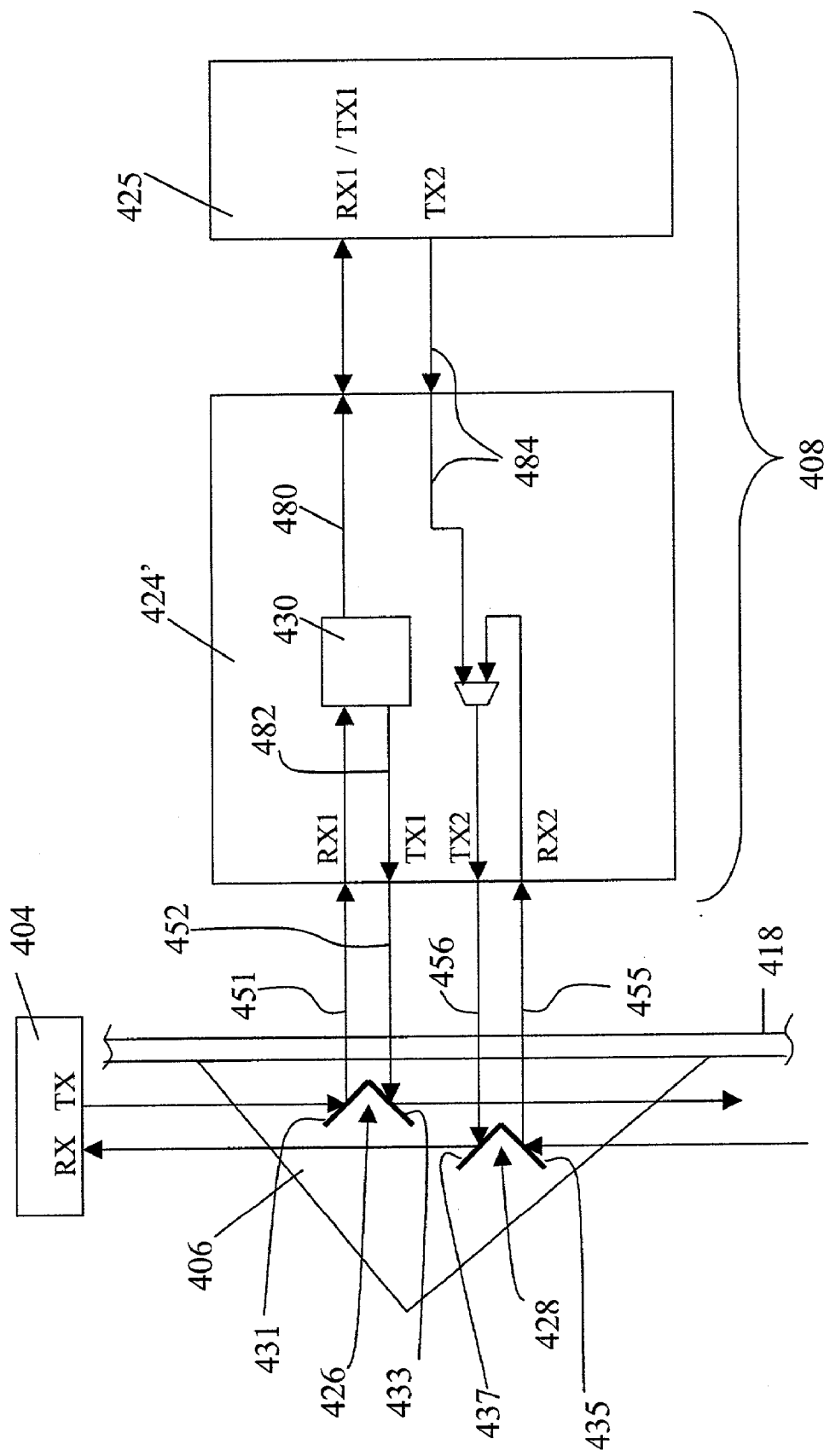
FIG. 7 is a simplified schematic diagram illustrating an active CPE transceiver made in accordance with an embodiment of the present invention.

Referring to FIG. 7, there is illustrated an active CPE transceiver 424' made in accordance with one embodiment of the present invention. The active CPE transceiver 424' includes a router 430. The active CPE transceiver 424' receives the first optical signal 451 from a rooftop transceiver of other CPE/POD and processes the signal by looking at the packets or cells. The active CPE 424' determines whether or not the packets or cells are intended for its particular customer site to determine whether or not to pass along the packets. In one embodiment, the active CPE transceiver 424' is targeted at a specific protocol or group of protocols (e.g., IP, ATM, etc.).

If the active CPE transceiver 424' determines that the data is intended for its particular customer site, the router 430 directs a signal 480 containing the data to be forwarded to the customer equipment 425 (for example, a hub, a switch, a router, a computer, a server and other such equipment). If it is determined that the data is not intended for its particular customer site, the router 430 directs a signal 482, providing the second optical signal 452, back to the POD 406 to be forwarded to the next POD and CPE along the communication path 441 (see FIGS. 4 and 5). The optical signal 482 is re-transmitted by the CPE and impinges on the second surface 433 of the first reflective element 426 of the POD 406 and is redirected to the next POD (e.g., POD 406b, see FIG. 6) to be again redirected by the next POD into the next CPE transceiver, (e.g., second CPE transceiver 424b).

The CPE equipment 408 is further configured to allow communication of data within both the MTU distribution network 401 and the free-space network 120 (see FIG. 4). The customer equipment 425 can generate a CPE transmit signal 484. The CPE transmit signal 484 is received by the active CPE transceiver 424'. The active CPE transceiver 424' incorporates or multiplexes the CPE transmit signal 484 with signals received from other equipment (e.g., fifth optical signal 455), if present, and forwards the sixth optical signal 456, including the CPE transmit signal 484, to be reflected by the second surface 437 of the second reflective element 428 of the POD 406 back to the rooftop transceiver 404 or to a next POD.

In one embodiment, a fifth optical signal 455 received from another CPE/POD is forwarded to the router 430 to determine if the fifth signal includes data intended for the customer equipment 425. If the fifth signal 455 does include data for the CPE equipment, the router 430 routes the data to the customer equipment 425. If the fifth optical signal 455 does not include data for the CPE equipment, the router 430 redirects the fifth optical signal to be transmitted as the sixth optical signal 456 to impinge on the second reflective element 428 of the POD 406 to be redirected to the rooftop transceiver or equipment of the MTU network 401 (e.g., another POD/CPE).

Providing active routing allows the customer to use equipment that runs at a slower speed than the MTU optical network 401, which can be advantageous in crowded buildings that would require very fast networks. This ability could be extended to throttling, which allows different customers to pay for different amounts of bandwidth, which would then be regulated by, for example, the CPE transceiver 424'. The network service provider can provide in a separate component or box the routing and throttling functions. Another advantage of an active system is the ability to provide additional levels of security. For example, by utilizing the active routing, the system 401 is capable of determining which customers are entitled to receive specific data, establishing a layer of security that can be used for the establishment of Virtual Private networks between floors. Thus, an active system can provide for lower customer speeds and added network security.

Figure 8:
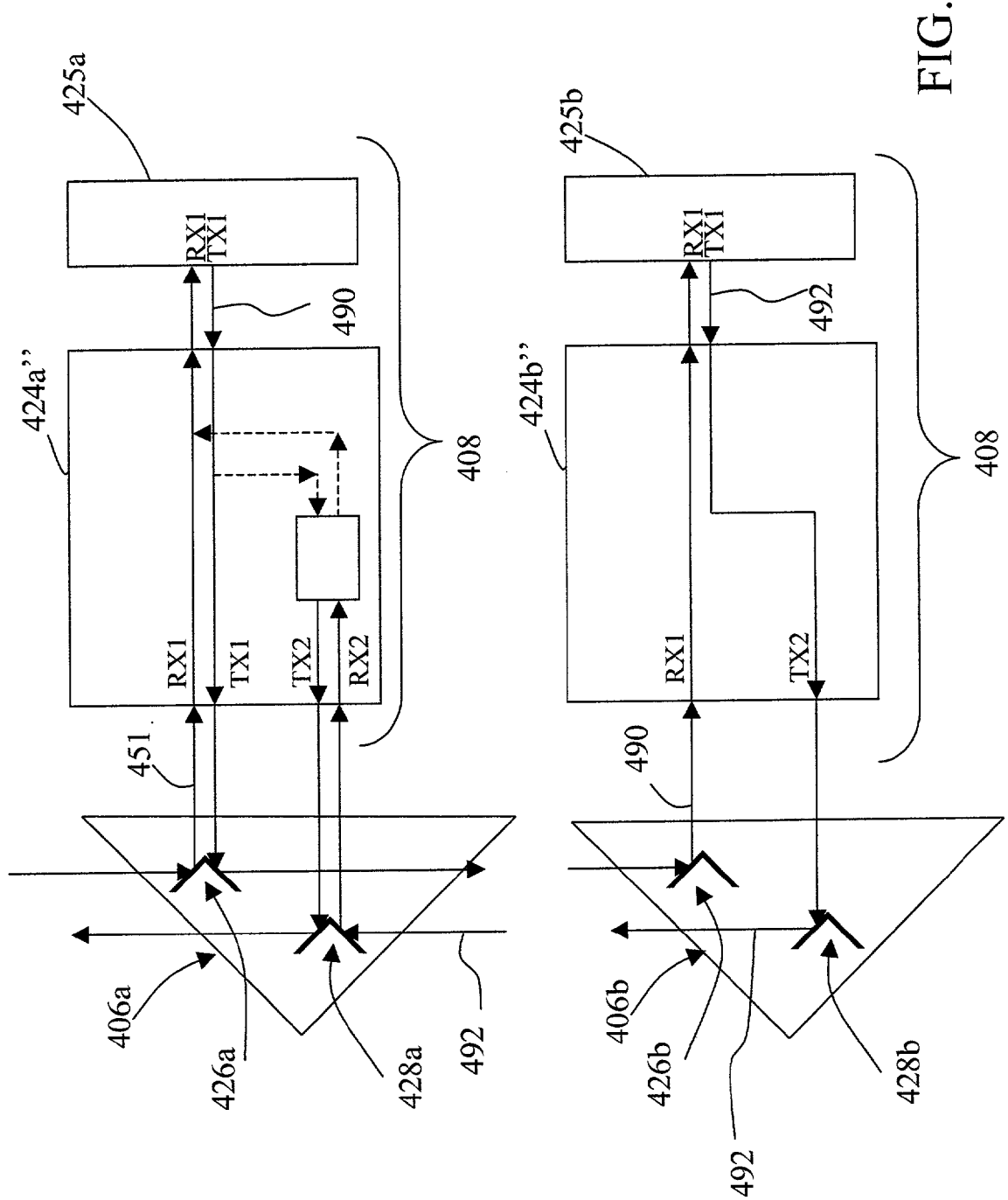
FIG. 8 is a simplified schematic diagram illustrating passive CPE transceivers made in accordance with another embodiment of the present invention.

Referring to FIG. 8, there is illustrated two passive CPE transceivers 424a" and 424b" made in accordance with an embodiment of the present invention. Unlike their active counterparts, the passive CPE transceivers 424" act on the physical layer leaving routing to customer equipment 425. Advantageously, a passive system allows the CPE transceiver 424" and customer equipment 425 to be used in a wider variety of applications. For example, transceivers can be configured in one of two modes: standard or endpoint. The lowest CPE transceiver in the building along an optical communication path is configured as an endpoint CPE 424b", and the remainder of the CPE transceivers in the optical communication path are configured as standard transceivers 424a".

A first optical signal 451 received at a standard CPE transceiver 424a" is passed by the CPE transceiver 424a" to the CPE equipment 425a. In one embodiment, the CPE transceiver 424a" forwards the signal to the standard CPE equipment 425 and re-transmits the signal without further processing. In one embodiment, the CPE equipment 425a re-transmits the signal 490 to the CPE transceiver 424a" without waiting for further processing. The CPE transceiver 424a" in turn transmits the signal 490 to impinge on the first reflective element 426a of the first POD 406a. The reflective element 426a reflects the signal 490 and directs the signal to impinge on the second POD 406b. The first reflective element 426b of the second POD 406b reflects the signal 490 to additional equipment, for example, the endpoint CPE transceiver 424b". The endpoint transceiver forwards the signal 490 to the CPE equipment 425b, where the CPE equipment processes the signal and data. The endpoint CPE equipment 425b does not re-transmit the signal because the CPE equipment is the endpoint.

When the endpoint CPE equipment 425b transmits data to be communicated over the MTU network 401 and/or free space network 120, the endpoint CPE equipment 425b generates and sends an endpoint data signal 492 to the endpoint CPE transceiver 424b". The endpoint CPE transceiver optically transmits the endpoint data signal to impinge on the second reflective element 428b of the second POD 406b. The second reflective element 428b redirects the endpoint data signal 492 to be received by the rooftop transceiver 404 to impinge on a second reflective element 428a of a first POD 406a if present in the communication path.

The second reflective element 428a of the first POD 406a redirects the endpoint signal 492 to a standard CPE transceiver 424a". In one embodiment, the standard CPE transceiver 424a" includes a loop through 460. The loop through 460 simply receives the endpoint data signal 492 and re-transmits the signal to again impinge on the second reflective element 428*a* of the first POD 406*a* to be redirected to the next POD in the optical path or to the rooftop transceiver 404.

In one embodiment, the standard CPE transceiver 424*a*" is additionally configured to route the endpoint data signal 492 to the customer equipment 425 to allow communication within the MTU network 401. The standard CPE transceiver 424*a*" can additionally be configured to receive data from the CPE equipment 425*a* and multiplex the data from the CPE equipment 425*a* with the endpoint data signal 492 to be directed to the rooftop transceiver 404 or other POD and CPE equipment.

The network isolation that is provided by an active system is also possible utilizing the passive CPE transceiver 424" if the passive CPE transceiver 424" is used in concert with a third party router, for example, as part of the CPE equipment 425. This approach not only makes the system more flexible, but it would allow passive component manufacturers to focus on their area of expertise.

The following discussion focuses on the isolation of network and/or customer failures or faults with respect to the CPE transceivers 424. The present invention is typically implemented to prevent a malfunction at one POD or customer site from taking down an entire optical path or the entire network. Examples of three classes of malfunction can include: (1) CPE transceiver removal/misalignment; (2) CPE transceiver malfunction; and (3) CPE transceiver loss of power.

With respect to CPE transceiver removal or misalignment, some versions of the MTU optical network 401 include optical paths that rely on every node to serve as a relay. For this reason the removal or misalignment of a CPE transceiver 424 could potentially take down an optical path or potentially the network depending on network topology. Though little can be done to prevent deliberate customer removal of the CPE transceiver 424, this is highly unlikely. Additionally, because each POD along an optical path are aligned, the removal of one POD will not adversely affect the optical communication of the network 401 because the optical signal (e.g., transmit signal 451) simply continues along the path to impinge on the next POD of the path. The second possibility is accidental misalignment caused by a small earthquake, someone bumping into the equipment, or similar occurrences. This is avoided by insuring that all CPE transceivers 424 are securely mounted with the building and potentially with the PODs through a window or wall of the building. In one embodiment, the network 401 is established with alignment margins of error, whereby CPE transceivers have large receiver ports allowing some misalignment from an optimum alignment while still maintaining optical communication. Additionally, in one embodiment, the surface of the reflective element 426 or 428 reflecting the signal to be received by the CPE (e.g., first surfaces 431 and 435 of the first and second reflective elements 426 and 428, respectively) is configured to provide an increased beam divergence, thereby increasing the area of alignment with the CPE 408.

Another possible threat to the network is a fault or malfunction in one of the CPE transceivers 424. In one embodiment, this is remedied by having the CPE transceiver 424 switch into a loop through mode. This would be dependant on the ability of the CPE transceiver to detect a fault or be notified of a fault. In one embodiment, the rooftop transceiver 404 is configured to aid in fault detection. If a CPE transceiver 424 experiences a fatal fault and is itself unaware of it, the rooftop transceiver 404 detects the loss of traffic. The rooftop transceiver employs fault detection means to recognize and adjust for faults. A variety of simple algorithms, as would be understood by one skilled in the art, can be employed for the means of detecting the faulty CPE transceiver(s) 424. The rooftop transceiver 404 can then instruct the faulty CPE transceiver to go into loop through mode.

Figure 9A:
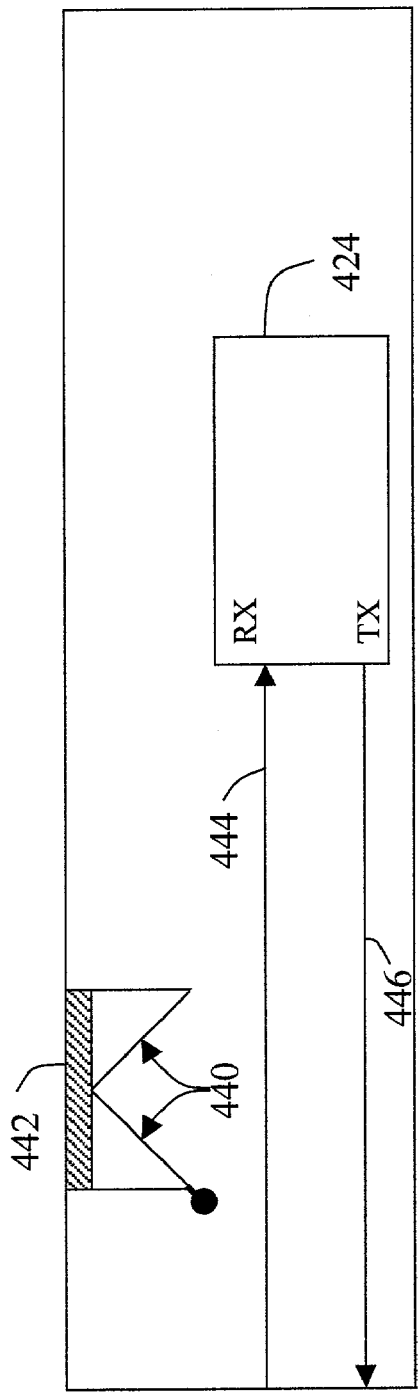
FIGS. 9A and 9B depict a simplified schematic diagram illustrating an optical passive relay made in accordance with an embodiment of the present invention.
Figure 9B:
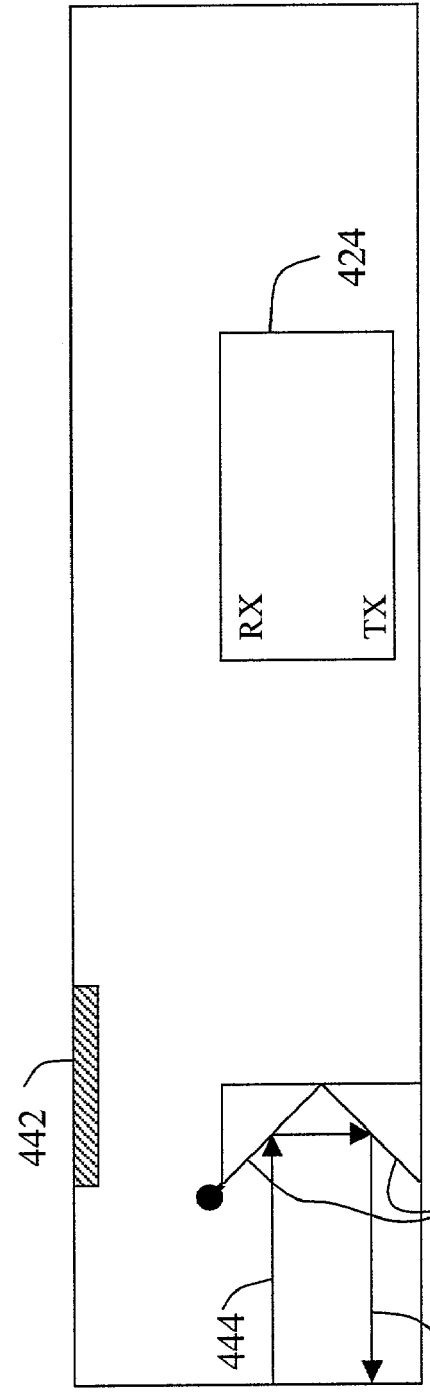

A third threat to the network is a power fault or loss of power in a CPE transceiver 424. In one embodiment, this problem is remedied with an optical passive relay. Referring to FIGS. 9A and 9B, there are illustrated simplified block diagrams of an optical passive relay (or passive optical loop-through) made in accordance with an embodiment of the present invention. This scheme uses a mirror pair 440 as a relay. Referring to FIG. 9A, in one embodiment, the mirror pair 440 is held in a first position out of the transmit and receive CPE communication paths 444 and 446, for example, by an electromagnet 442, during normal operating conditions.

Referring to FIG. 9B, during a loss of power to the CPE transceiver 424 the electromagnet 442 ceases to be magnetic and allows the mirror pair 440 to shift to a second position into the CPE communication paths 444, 446. In the second position, the mirror pair 440 serves as a beam relay to both the transmit and receive paths 444, 446, re-transmitting the transmit and receive beams 444 and 446, respectively, back to the POD 406. When power is restored to the CPE transceiver 424, the electromagnet 442 again becomes magnetic and attracts the mirror pair 440 removing the mirror pair from the communication paths. This mirror pair can also be employed as a loop through mode when the CPE transceiver is experiencing other errors or faults.

In addition to protecting against failure by loss of power, the optical passive relay 440 can also protect against failure of the transmit circuitry in the CPE transceiver 424, which is not done by an active relay system. Furthermore, the mirror pair 440 can be implemented using semi-transparent mirrors allowing the CPE transceiver 424 to continue receiving signals in loop through operation. In the case of a rooftop transceiver controlled error correction scheme, this allows the rooftop transceiver 404 to instruct the customer CPE transceiver 424 to re-attempt normal operation.

The MTU distribution network 401 as described above is configured to operate on the exterior of a building 400. However, the MTU network 401 operates equal well through open spaces within a building 400 where communication paths can be established. For example, the rooftop transceiver can be mounted within an elevator shaft as appose to the roof where the elevator does not interfere with the optical communication path. Additionally, the PODs 406 can also be mounted within the elevator shaft in optical alignment with the rooftop transceiver mounted in the elevator shaft. The PODs 406 continue to operate as described above redirecting the optical signals to and from the CPEs 408.

In one embodiment, a POD 406 can be optically aligned and coupled with a router (not shown) which routes the signal to CPEs 408. For example, one or more PODs 406 can be positioned per floor and signals redirected by the POD are processed by the router to determine if the signal is to be delivered to a CPE 408 on that floor. If the signal is to be delivered, the router routes the signal to the appropriate CPE. If not, the router re-transmits the optical signal to impinge on the POD 406 to be directed to the next POD along the optical path.

The MTU network 401 can also be incorporated within an atrium or other open space providing optical line of sight for establishing the optical communication paths between the rooftop transceivers and the PODs. As such, the phrase "exterior of the building" can be defined to include the structure of the build along an open space (e.g., along the building within an elevator shaft, and/or along the build within an atrium) allowing free-space links to be established to allow communication to and from the CPEs.

Figure 10:
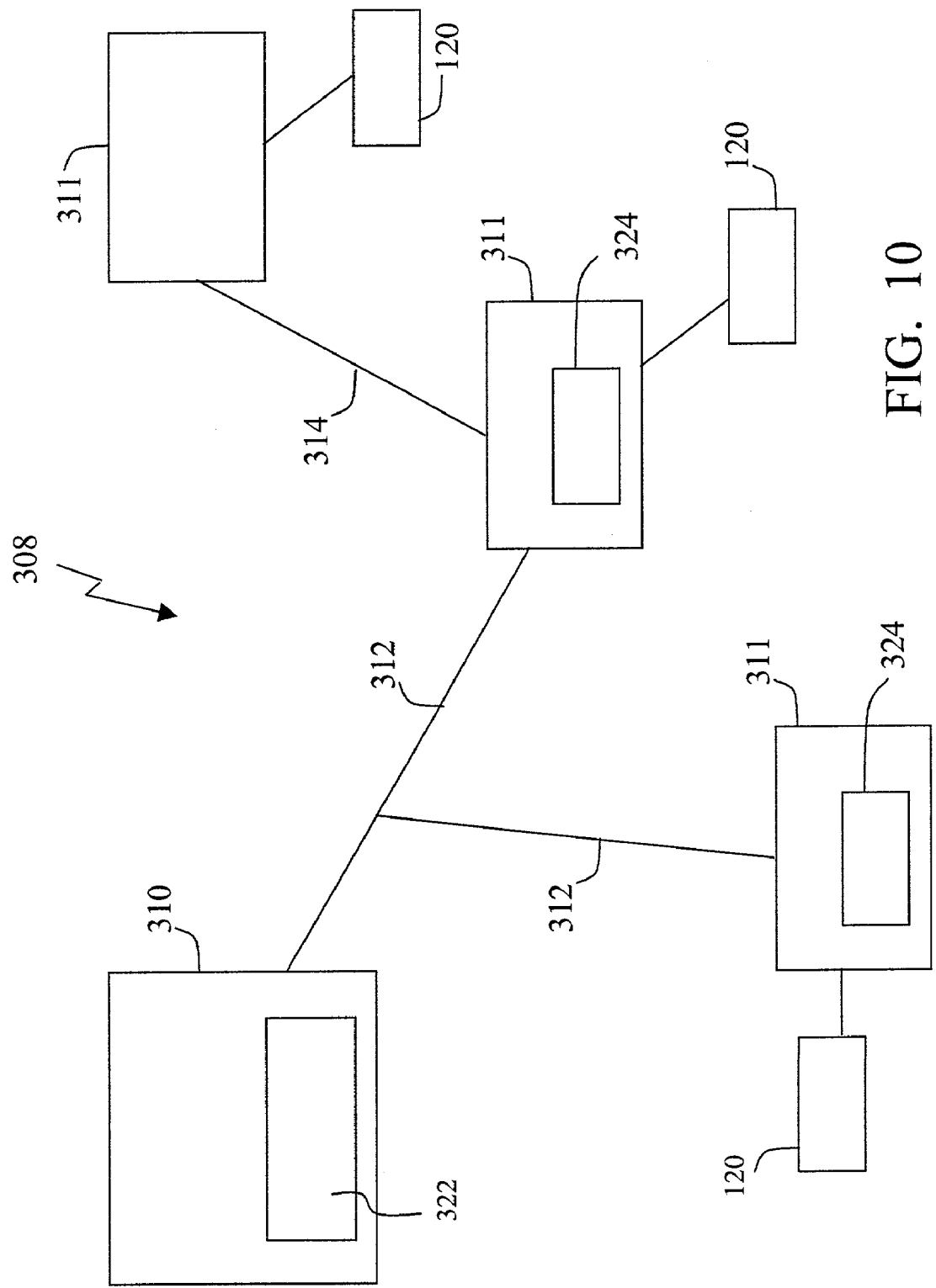
FIG. 10 depicts an apparatus and method according to one embodiment of the present invention to operate digital media head end equipment in a distributed fashion.

FIG. 10 depicts an apparatus and method according to one embodiment of the present invention for operate digital media head end equipment 310 in a distributed fashion to serve a plurality populated areas, such as metropolitan areas and other such areas, that are separated by some distance but connected by terrestrial 312 or submarine 314 optical fiber. This allows the head end equipment to be shared across long distances and across continents versus building new head end equipment in each distinct geographic area.

The local, distributed, free-space network 120 couples with the long haul/submarine network 308 to communicate with the head end equipment 310. Thus, data can be communicated over long distances and still be distributed to customers through the free-space network(s) 120. The free-space networks 120 couple to the long haul network 308 through network points of presence (POP) 311. Additionally, the long haul network 308 can include a controller 322 that provides network control of data communicated across the long haul network 308. The controller 132 can additionally provide error and fault compensation for the long haul network. In one embodiment, each local free-space network 120 includes a controller 324. The local controller 324 provides control for the distribution of data across the local free-space network 120, and provides fault compensation. For example, the local controller can provide alternate routing of data across alternate communication paths within the local free space network or external networks coupled with the local free space network.

The following describes examples of optical networks for providing communication over free space links according to some embodiments of the present invention. In one example a network can include a four ring backbone high-speed operating at 1.25 Gbps. The backbone can utilize one or more MultiLink links (for example 1250/1000 MultiLinks providing up to 1250 Mbps at distances on the order of 1000 meters) and MonoLinks (for example 1250/300 MonoLinks). Spurs can be added off of one or more buildings or facilities using CompactLinks and spurs can be added to one or more buildings using MonoLinks (for example MonoLink 155/xxx) (where xxx is substantially any length, for example 100 meters, 1000 meters, 2000 meters and other distances limited only by capability of the source of the optical signal, such as a laser, and receive capabilities) where each can be utilized to target a separate building.

In one embodiment, a network is configured with 20 links in various configurations. When a multi-tenant unit has more than three CompactLinks, it may be more cost effective to deploy a single MonoLink 155/xxx and distribute the data through a switch. When multiple CompactLinks are used on the same building, a switch is not required because each CompackLink provides an output (for example each has an RJ45 output) that can be wired directly to the customer (e.g., CPE), whether it is a set top box, computer or other equipment.

In some embodiments that employ MonoLink spurs, a switch is utilized that includes an optical interface to an electrical interface for converting the optical signal to an electrical signal. The electrical signal can then be distributed throughout the building utilizing existing wiring (e.g., existing coax, or phone lines), preventing the need to route new cable to the customer's destination. In one embodiment, the electrical interface converts to a 10/100 coax versus the RJ45 in order to utilize existing cable wiring in or on the buildings. In this case, the free space link heads are mounted to the roof, balcony or other areas of the building that provide stable mounting and line of sight optical coupling, and the data is distributed through switching. In some embodiment, the link heads receive optical signals over the free space links 124 and direct optical signals without electro-optical conversion to a building distribution system to distribute the data to the intended recipient.

Figure 11:
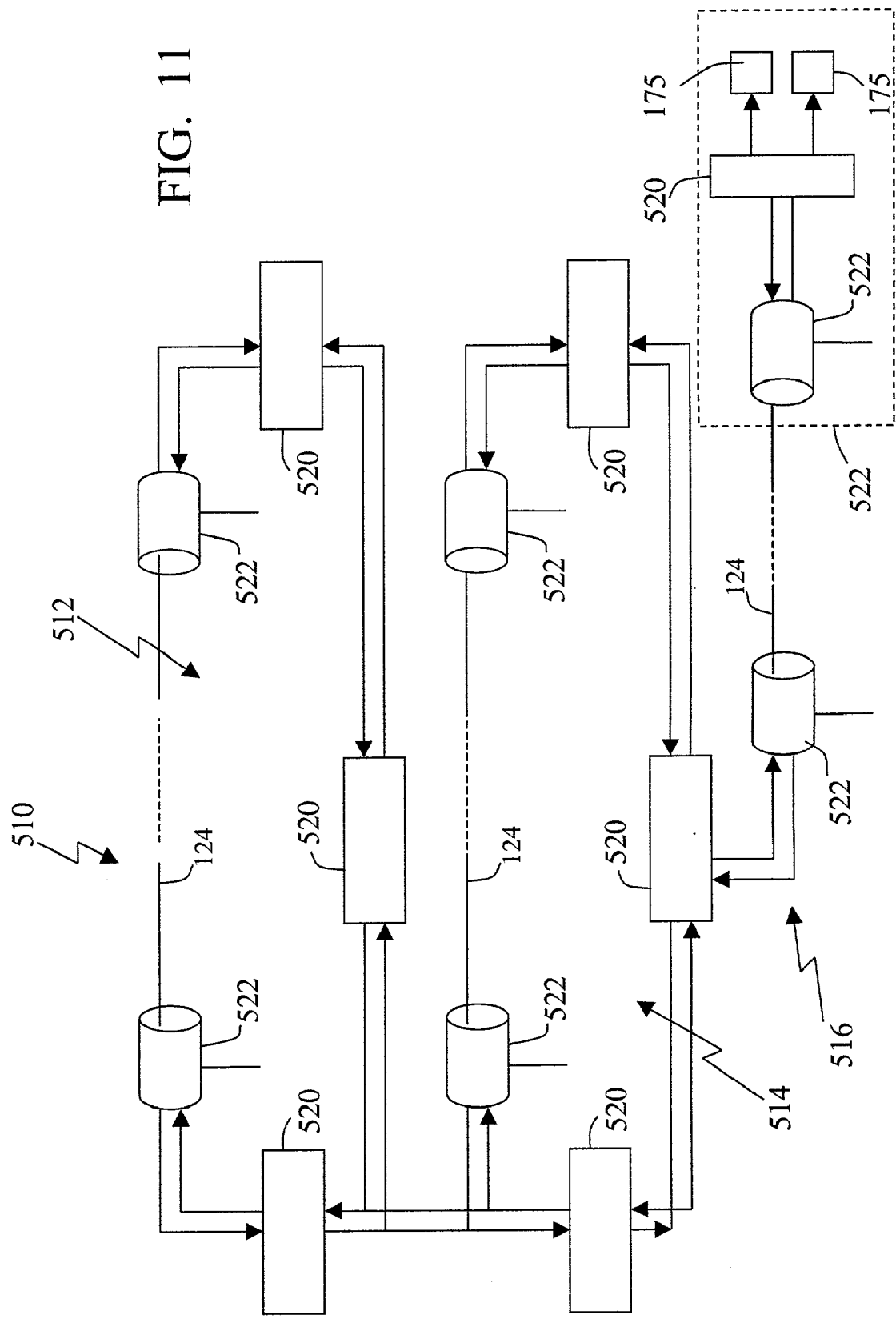
FIG. 11 depicts a network having a 2-ring back Monolink bone structure and a spur according to one embodiment of the present invention.

FIG. 11 depicts a network 510 having a 2-ring back Monolink bone structure (a first ring 512 and a second ring 514) according to one embodiment of the present invention. The network 510 further includes a MonoLink 155/xxx used as a spur 516. Each ring 512, 514 and the spur 516 provide optical wireless communication across one or more free-space links 124. Switches and/or routers 520 are included within the rings and spur to control the data flow and route the data between link heads and buildings 522.

Data communicated across the spur 516 can be transmitted at rates of, for example, as high as 100 Mbps for fast Ethernet or as slow as a dial-up rate for internet only use. Typically, multiple channels are allocated to several users 175. For example, for cable TV subscribers, there can be approximately a 4 Mbps feed for each subscriber. By dividing the total available bandwidth for a MonoLink, each individual spur can serve as many as 26 subscribers. In one embodiment, data traffic for 38 subscribers can be achieved using ATM equipment or some other aggregation device. This provides an economical and scalable method to handle many users in the same building. The network spurs can be configured to operate at higher data rates above the 155 Mbps. In one embodiment, the spur 516 can be implemented to operate at a rate to support the backbone rate of 1.25 Gbps. This spur can be used as the new leg of a ring in the future. In one embodiment, MonoLinks 20/xxx can be used to support five customers with a bi-directional rate of 4 Mbps each.

In some embodiments a CompactLink is used for the spur 516 connection, allowing the connection of one or more CAT-5 shielded pairs to an Ethernet capable device, such as an Ethernet capable set top box (STB) or computer, directly with no switch in between. As many as two subscribers can be provisioned 4 Mbps each on a single compact link assuming they are provided 4 Mbps each. If the data communication bandwidth is reduced to 3 Mbps and the data traffic is spilt between each user, the resulting data bandwidth is approximately 300 Kbps divided equally. In one embodiment, traffic shaping and bandwidth throttling is performed at the back-bone switch or router 520 as apposed to adding another router at a building 522 if only a single subscriber is using the spur. When more than one subscriber is provisioned on a spur, a hub, for example an Ethernet hub, can be used to distribute the signals. Any one of the described configurations can be implemented, each of which can be provisioned from the same switch or router in the back-bone to the same or different MTU buildings.

There are various methods that may be used to distribute data to customers 175 within a building 522. If the CompactLinks are to be used without a switch 520, an Ethernet output can be routed directly to the end user's equipment, for example using CAT-5 routed from the link head 522. Where possible, a CAT-5 connection from the CompactLink is used to convert the signal to allow the utilization of existing wiring, such as coaxial cables. If a switch is to be used with the CompactLinks, then the signal interface can be converted to coaxial cable interface built into the switch thereby utilizing the wiring that may be present on or with a structure.

When a MonoLink 155/xxx is used in rings or spurs, an optical interface can be employed to convert optical signals to electrical signals, to allow routing using existing CAT-5 shielded cable, coaxial cable, or driven over phone lines. Referring back to FIG. 3, where possible building distribution systems 174 for distributing the data, such as media, to the customers or subscribers 175. Some phone wiring, such as phone wiring in Turkey and other countries, is not a shielded twisted pair but rather two single unshielded parallel wires. This existing wiring may work with a DSL distribution device such as an RC8000, but preferably coax, CAT-5 or other communication lines are utilized. When utilizing existing wiring for distribution, the existing wiring is typically able to drive 4 Mbps bi-directionally over the existing building wires to provide adequate distribution for some digital video applications. A switch or router 172 coupled with the backbone ring(s) can be configured to provide failure and redundancy switching. Switches or routers that connect with a spur can be configured to shape traffic and control the quality of service to MonoLinks for driving building distribution networks 174, which can include free-space coupling (see FIGS. 4 and 5), CAT-5, coaxial cable, phone lines and other coupling.

In one embodiment, the free-space network 120 is configured to include head end equipment 310 to couple with an external network 308 to receive data and distribute data (see FIG. 10). For example, the head end equipment can be configured to receive and distribute 120 channels of digital video supplied by a professional direct-to-home (DTH) satellite service provider. In one embodiment, the present free-space communication network 120 includes one or more control centers 324 configured to provide network control. The control center(s) can additionally be configured to control distribution, verify authorization for customers to receive data, generate billing and monitor the network to optimize performance and adjust or compensate for errors or faults.

The present free-space network 120 is configured to have characteristics that provide optimal communication. In one embodiment, the network 120 has the following characteristics: laser link heads 166 have a communication distance from 0 to 3 Km, preferably 0 to 2 Km, for example having an average distance of 600 meters; the network has a high reliability and availability of data (for example, an up-time of at least 95%, preferably 98% and more preferably 99% up-time); digital video is available over the network, for example 120 channels at 3.5 Mb/Channel; Internet data variable bandwidth is provided; the network 120 provides expansion to voice and video-on-demand; easy installation, maintenance and management of network; demand based build-out model; flexible data rates and rate throttling for end users; maintain security of data (i.e., include firewalls); use existing building wires when possible and reliable; providing a scalable network, for example, capable of having a mix of business and residential customers (although not required) with flexibility to grow both the business and residential network; customers are provided adequate bandwidth, for example, a customer is provided a 5.0 Mb per customer of both video and IP; and business customers are provided with adequate bandwidth, for example, business customer is provided a 1–1000 Mb data per business customer (IP only).

In one embodiment, the network 120 management is configured such that: devices of the network 120 support Simple Network Management Protocol (SNMP) (e.g., devices provided by LightPointe, San Diego, Calif.; Cisco Systems, San Francisco, California; and others); In-Band remote monitoring and configuration; a control center 167 that can be located substantially anywhere in the network 120 or distributed across the network; and bandwidth throttling.

In providing the optical communication over the free-space links 124, the network 120 includes an optical transmission device, typically a laser. The laser is configured to provide: high bandwidth (e.g., 100 Mbps, 1.25 Gbps or greater); at variable ranges (e.g., 300 meters, 1000 meters, 2000 meters or more); bi-directional links; secure links (making tapping into the links difficult); and a low bit error rate, less than $10^{-9}$, preferably less than $10^{-10}$, and more preferably less than $10^{-11}$. The laser can be configured to provide an optical signal capable of transmission across the free-space link 124 without requiring a spectrum license. In one embodiment, the laser also provides transparent protocol delivery.

In one embodiment, the network 120 further includes switches 172 and/or routers (see FIGS. 2 and 3). The switches and routers implemented provide accurate and reliable delivery of data. Preferably, these switches and routers are configured to provide: high bandwidth across ports; versatile module slots; easy to use management software; advanced security features; bandwidth aggregation; Virtual Local Area Network (VLAN) support; and hot swap modules.

The topology of the free-space network 120 can be substantially any reliable topology, including ring(s), mesh, ring and spur, mesh and spur, and other such topologies. The ring topology is one advantageous and cost effective topology. In one embodiment, the network topology is configured to provide: bi-directional paths; single point of failure redundancy; shared bandwidth; be easily expandable; and be easily maintained.

The present free-space optical network 120 is capable of providing communication for substantially any type of communication entity, including residential, business and a mix of both residential and business.

In one embodiment, the free-space optical network provides: a 1.25 Gbps Bi-directional data rate; a 2000 meter range; high reliability; a transparent protocol; ST/SC-compatibility; SNMP manageability; and spatial redundancy (e.g., four spaced transmit beams and/or one large diameter transmit beam directed such that the optical beams impinge on a plurality of receive objectives).

Other components of the network may include, for example, one or more video networks devices such as a Pixstream VDS5000 (from Pixstream Incorporated of Waterloo, Canada). The video network devices are preferably configured to: have a modular (e.g., 14 slots), high speed midplane system design; support MPEG-2 4:2:2 P@ML and 4:2:0 MP@ML compression; support MPEG-2 over IP (IP multicast); support redundancy, hot swappable modules, hot standby and forward error correction; and provide SNMP support. The network 120 may also include one or more switches, such as a Cisco 2900MXL switch or a Cisco Catalyst 2948G (from Cisco Systems, U.S., California) which provides: 48 port 10/100 Mbps Ethernet; two port 1000BaseX Gigabit Ethernet; 24 Gbps non-blocking switch fabric; and redundant, hot swappable external power supply and other fault tolerant features. The network may also include a set-top box, such as a DSL4000 Set-top box providing: MPEG-2 video decoder; built in web browser; Ethernet interface; video on demand; pay per view events; web browsing; and E-mail.

The entire content of the following United States patent is hereby fully incorporated into the present application by reference: U.S. Pat. No. 6,239,888, filed Apr. 24, 1998, entitled TERRESTRIAL OPTICAL COMMUNICATION NETWORK OF INTEGRATED FIBER AND FREE-SPACE LINKS WHICH REQUIRES NO ELECTRO-OPTICAL CONVERSION BETWEEN LINKS, by inventor Heinz Willebrand. The entire contents of the following United States patent application is hereby fully incorporated into the present application by reference: U.S. patent application Ser. No. 09/482,782, filed Jan. 13, 2000, entitled HYBRID WIRELESS OPTICAL AND RADIO FREQUENCY COMMUNICATION LINK, by inventors Heinz Willebrand and Maha Achour. By way of example, the laser link heads 166 (FIG. 1), 152 (FIG. 13), the rooftop transceivers 404, and/or any other components described herein may comprise any of the devices or methods described in the above cited United States patent and patent application. By way of further example, the optical communication network 120 of the present invention may be implemented utilizing the optical components and control techniques, or be similar components and techniques, described in the above cited patent and patent application.

While the invention herein disclosed has been described by means of specific embodiments and applications thereof, numerous modifications and variations could be made thereto by those skilled in the art without departing from the scope of the invention set forth in the claims.

What is claimed is:

1. An optical communication network, comprising:
   a plurality of buildings, wherein each building houses at least one of a residence and a business;
   a plurality of free-space optical links, where each of the plurality of free-space optical links is defined between two of the plurality of buildings and data is communicated across the plurality of optical links;
   each of the plurality of buildings includes a distribution system configured to receive the data communicated across at least one of the plurality of optical links and to distribute the data to an intended recipient within the building;
   the plurality of optical links are configured to form a network topology providing alternate communication paths for at least two of the plurality of buildings; and
   an external network is coupled with the optical communication network, wherein at least some of the data is communicated between the external network and the optical communication network;
   wherein at least one of the distribution systems includes a roof top transceiver mounted on a building and communicationally coupled with at least one of the plurality of optical links to receive data, where the roof top transceiver is configured to transmit a first optical signal across free-space along an exterior of a building to impinge on a first POD;
   wherein the first POD is configured to redirect the first optical signal to be received by a first customer premises equipment (CPE);
   wherein the first CPE is configured to transmit a second optical signal to impinge on the first POD;
   wherein the first POD is configured to redirect the second optical signal to impinge on a second POD; and
   wherein the second POD is configured to redirect the second optical signal to be received by a second CPE.

2. The network as claimed in claim 1, wherein a first building of the plurality of buildings is configured to receive a first set of data and to forward a second set of data to a second building, and the second building is configured to receive the second set of data and to forward a third set of data to a third building, wherein the third set of data includes at least a portion of the first set of data.

3. The network as claimed in claim 2, wherein the first building is further configured to forward a fourth set of data to a fourth building.

4. The network as claimed in claim 1, wherein the network topology includes a ring topology and a spur topology.

5. The network as claimed in claim 4, wherein the ring topology includes a subset of plurality of buildings each housing at least one business, and the spur topology includes at least one building providing a residence.

6. The network as claimed in claim 1, wherein the network topology includes a first ring structure coupled with a second ring structure, where the first ring structure includes a first subset of plurality of buildings and the second ring structure includes a second subset of plurality of buildings.

7. The network as claimed in claim 1, wherein the network topology includes a mesh topology.

8. The network as claimed in claim 1, wherein at least one of the distribution systems of one of the buildings includes passive optical deflectors (POD) mounted to the one of the plurality of buildings.

9. The network as claimed in claim 1, wherein:
   the external network includes at least one of a satellite network, a global network and a video on demand (VOD).

10. A method for communicating data throughout a network, comprising the steps of:
    establishing a plurality free-space optical communication links between a plurality of buildings, wherein each of the plurality of buildings houses at least one of a business and a residence;
    providing at least one alternate communication path within the network through at least one of the plurality of free-space links;
    optically communicating data over the plurality of free-space links;
    receiving the data at a first building;
    distributing at least a first portion of the data throughout the first building to at least one recipient, where the recipient is one of the business and the residence;
    receiving the data from at least one of a plurality of external networks;
    generating a first optical signal carrying the data;
    distributing the first optical signal over the network including transmitting the first optical signal over a first free-space link;
    the step of receiving the data at the first building including receiving the first optical signal at the first building;
    wherein the step of distributing the first portion of the data throughout the first building includes,
    generating a third optical signal;
    transmitting the third optical signal over free-space along an exterior of the first building; and
    re-directing the third optical signal to be received by a first customer premises equipment (CPE);
    the first CPE generating a fourth optical signal;
    transmitting the fourth optical signal;
    re-directing the fourth optical signal over free-space along the exterior of the first building; and again re-directing the fourth optical signal to be received by a second CPE.

11. The method as claimed in claim 10, further comprising the steps of:
generating a second optical signal at the first building, wherein the second optical signal includes at least a second portion of the first portion of the data; and
transmitting the second optical signal over a second free-space link.

12. The method as claimed in claim 10, wherein:
the step of distributing the data throughout the building including utilizing an existing distribution system within the building;
routing the data to the existing distribution system; and
routing the data through the existing distribution system to intended recipients.

* * * * *